United States Patent
Gaknoki et al.

(10) Patent No.: US 9,401,634 B2
(45) Date of Patent: Jul. 26, 2016

(54) SATURATION PREVENTION IN AN ENERGY TRANSFER ELEMENT OF A POWER CONVERTER

(71) Applicant: Power Integrations, Inc., San Jose, CA (US)

(72) Inventors: Yury Gaknoki, San Jose, CA (US); Mingming Mao, Saratoga, CA (US); Robert J. Mayell, Los Altos, CA (US)

(73) Assignee: Power Integrations, Inc., San Jose, CA (US)

( * ) Notice: Subject to any disclaimer, the term of this patent is extended or adjusted under 35 U.S.C. 154(b) by 578 days.

(21) Appl. No.: 13/644,822

(22) Filed: Oct. 4, 2012

(65) Prior Publication Data

US 2014/0098571 A1    Apr. 10, 2014

(51) Int. Cl.
*H02M 3/22* (2006.01)
*H02M 1/40* (2007.01)
*H02M 3/335* (2006.01)

(52) U.S. Cl.
CPC *H02M 1/40* (2013.01); *H02M 3/22* (2013.01); *H02M 3/33546* (2013.01); *H02M 3/33538* (2013.01)

(58) Field of Classification Search
CPC .............................................. H02M 2001/0025
USPC ........... 323/313; 363/20, 21.04, 21.05, 21.07, 363/21.08, 21.09, 21.1, 21.11, 21.12, 21.13, 363/21.15, 21.16, 21.17, 21.18
See application file for complete search history.

(56) References Cited

U.S. PATENT DOCUMENTS

| | | |
|---|---|---|
| 4,127,894 A | 11/1978 | Bishop et al. |
| 4,439,822 A | 3/1984 | Cocconi |
| 5,355,299 A | 10/1994 | Carpita |
| 5,801,932 A | 9/1998 | Hwang et al. |
| 6,002,596 A | 12/1999 | Mayer et al. |
| 6,191,960 B1 | 2/2001 | Fraidlin et al. |
| 6,252,781 B1 | 6/2001 | Rinne et al. |
| 6,304,463 B1 | 10/2001 | Krugly |
| 6,442,052 B1 | 8/2002 | Hemena et al. |
| 6,483,726 B2 | 11/2002 | Chen et al. |
| 7,012,820 B2 | 3/2006 | Jitaru |
| 7,759,984 B2 | 7/2010 | Takeuchi et al. |
| 8,102,683 B2 * | 1/2012 | Gaknoki et al. ............ 363/56.11 |
| 8,130,517 B2 * | 3/2012 | Mayell ........................ 363/56.01 |
| 8,467,157 B2 * | 6/2013 | Gaknoki et al. ................ 361/18 |

(Continued)

FOREIGN PATENT DOCUMENTS

CN          1608596 A       4/2005

*Primary Examiner* — Timothy J Dole
*Assistant Examiner* — Bryan R Perez
(74) *Attorney, Agent, or Firm* — Blakely Sokoloff Taylor & Zafman LLP

(57) ABSTRACT

A controller for use in a power converter includes logic circuits to turn on and off a switch to regulate an output quantity. A first integrating capacitor is charged with a combination of a first current and a second current while the switch is turned on. The first current is proportional to a reset voltage and the second current is proportional to an input voltage. A reference generation circuit including a second integrating capacitor is charged with the first current during a previous switching cycle of the switch. The reference generation circuit generates a reference voltage in response to the second integrating capacitor. A comparator provides a stop signal to the logic circuits to turn off the switch in response to a comparison of a voltage across the first integrating capacitor with the reference voltage.

28 Claims, 11 Drawing Sheets

(56) References Cited

U.S. PATENT DOCUMENTS

| | | | |
|---|---|---|---|
| 8,553,439 B2 * | 10/2013 | Gaknoki et al. | 363/97 |
| 2010/0246215 A1 | 9/2010 | Mase et al. | |
| 2011/0194310 A1 * | 8/2011 | Mayell | 363/21.11 |
| 2011/0254369 A1 | 10/2011 | Mayell | |
| 2012/0069611 A1 * | 3/2012 | Yang et al. | 363/44 |

* cited by examiner

SATURATION PREVENTION IN AN ENERGY TRANSFER ELEMENT OF A POWER CONVERTER

BACKGROUND INFORMATION

1. Field of the Disclosure

The present invention relates generally to power converters and, more particularly, the present invention relates to forward converters.

2. Background

Many electrical devices, such as cell phones, personal digital assistants (PDA's), laptops, etc., utilize power to operate. Because power is generally delivered through a wall socket as high voltage alternating current (ac), a device, typically referred to as a power converter, can be utilized to transform the high voltage ac input to a well regulated direct current (dc) output through an energy transfer element. Switched mode power converters are commonly used due to their high efficiency, small size, and low weight to power many of today's electronics. In operation, a switch is utilized to provide the desired output quantity by varying the duty cycle (typically the ratio of the on-time of the switch to the total switching period), varying the switching frequency, or varying the number of pulses per unit time of the switch in a power converter.

One power conversion topology is referred to as a forward converter. A forward converter may use one, two, or more active switches to apply an input voltage to the primary winding of a transformer, which may also be referred to as an energy transfer element. The single-switch forward converter uses one active switch to apply an input voltage to the primary winding of the transformer while the two-switch forward converter utilizes two active switches to apply an input voltage to the primary winding. In each type of converter, a secondary winding on the transformer produces a scaled replica of the voltage on the primary winding. The voltage on the secondary winding is rectified and filtered to become the output voltage.

A power converter may use a controller to provide output regulation to an electrical device, which may generally be referred to as a load, by sensing and controlling the output of the power converter in a closed loop. More specifically, the controller may be coupled to a sensor that provides feedback information about the output of the power converter in order to regulate the output quantity delivered to the load. The controller regulates the output quantity delivered to the load by controlling the one or more active switches to turn on and off in response to the feedback information from the sensor.

In operation, both the single switch and the two switch configuration may allow the magnetic flux of the transformer to reset, or in other words, return to a much lower value, when the active switches are off. Resetting the magnetic flux of the transformer prevents excess stored energy from saturating the transformer. The reset can be achieved by applying a reset voltage of appropriate magnitude and duration to the primary winding when the active switches are off.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
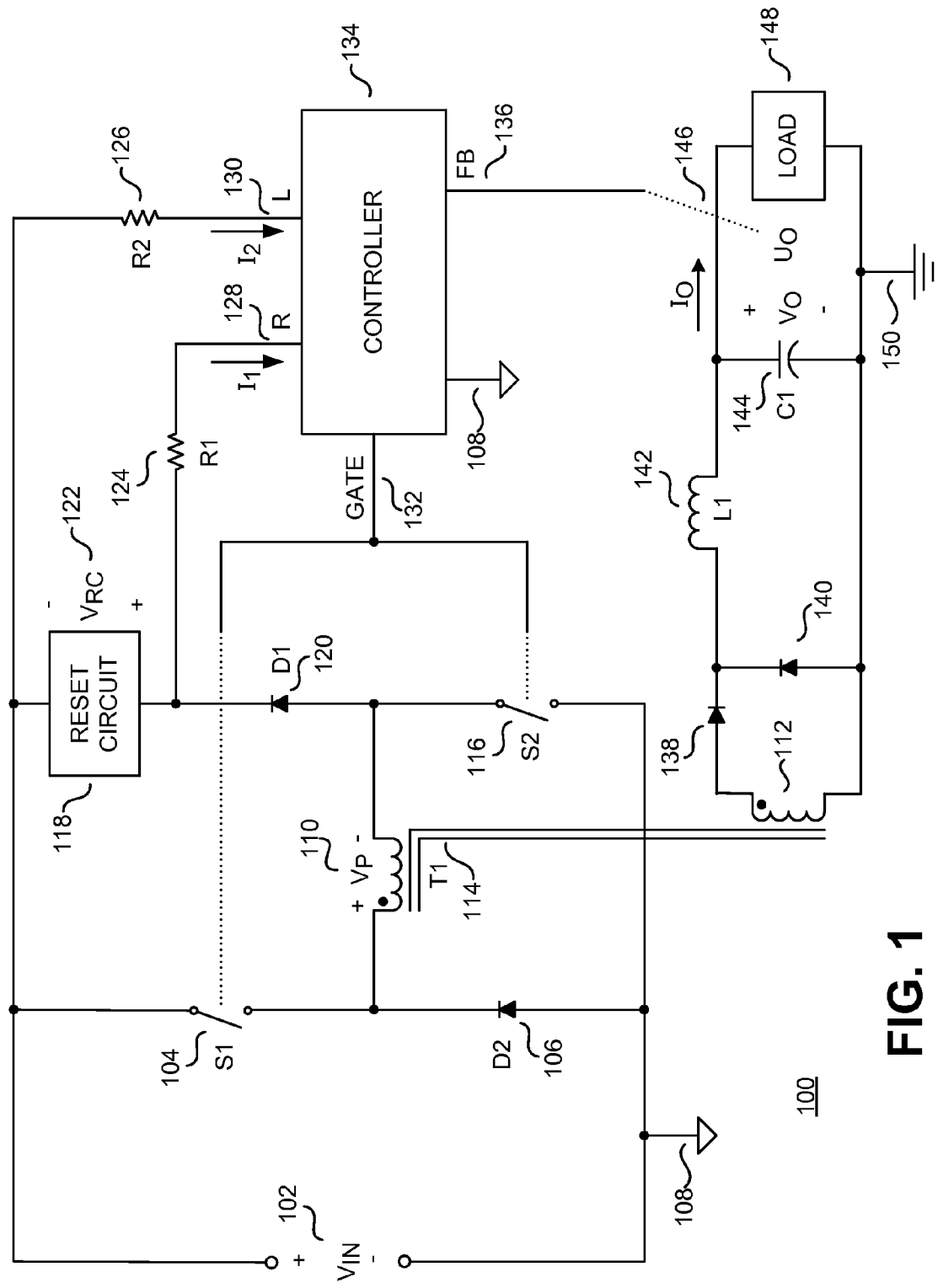
FIG. 1 is a schematic diagram illustrating an example two-switch forward converter including a controller, in accordance with teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As mentioned above, both the single-switch and the two-switch forward converter configurations may allow the magnetic flux of the transformer to reset, or in other words, return to a much lower value, when the active switches are off. Resetting the magnetic flux of the transformer prevents excess stored energy from saturating the transformer. The reset can be achieved by applying a reset voltage of appropriate magnitude and duration to the primary winding when the active switches are off.

It may be desirable to set the reset voltage to a higher value than the input voltage which appears on the primary winding when the switches are on. In general, a reset voltage with greater magnitude will allow for a larger duty cycle ratio. A common low cost technique to provide a reset voltage may utilize a passive reset circuit that develops a substantially constant voltage. The substantially constant reset voltage is applied to the primary winding during the reset time of the transformer, or in other words, during the time when the active switches are off. For a two-switch forward converter, the reset voltage is the sum of the input voltage and the constant voltage developed by the passive reset circuit. It should be understood that the reset voltage may be applicable for other forward converter configurations, such as a full bridge forward converter. For a single-switch forward converter, the reset voltage is the voltage developed by the passive reset circuit.

However, the appropriate reset voltage can change in response to a change in the input voltage or to a change in the load on the power converter. In addition, the passive reset circuit may not be able to respond fast enough to transient events, such as for example the start-up and the shut-down of the power converter, to guarantee the proper reset of the transformer.

Examples of the present invention include a saturation prevention circuit that receives signals representative of the magnetizing voltage of the energy transfer element. For instance, in one example, a capacitor is charged with a combination of a first current proportional to a reset voltage and a second current proportional to an input voltage of the power converter and compared to a reference voltage. The reference voltage may be generated by a capacitor charged with the first current proportional to the reset voltage during a previous switching cycle of an active switch of the forward converter.

Referring first to FIG. 1, a schematic diagram illustrating an example power converter 100 including a controller 134 is shown, in accordance with teachings of the present disclosure. As shown in the illustrated example of FIG. 1, power converter 100 includes an energy transfer element T1 114, a primary winding 110 of the energy transfer element T1 114, a secondary winding 112 of the energy transfer element T1 114, two active switches S1 104 and S2 116, two passive switches D1 120 and D2 106, an input return 108, a reset circuit 118, a resistor R1 124, a resistor R2 126, an output diode 138, a freewheeling diode 140, an output inductor 142, an output capacitor C1 144, an output return 150, and a controller 134, coupled as illustrated. In the example, controller 134 is shown as including a reset voltage sensing terminal 128, a line sensing, or input voltage sensing, terminal 130, a feedback terminal 136, and a terminal that outputs a gate signal 132, which may also be referred to as a drive signal. Also shown in FIG. 1 are an input voltage $V_{IN}$ 102, a reset circuit voltage $V_{RC}$ 122, a primary voltage $V_P$, a first current $I_1$, a second current $I_2$, a feedback signal 146, an output quantity UO, an output voltage $V_O$, an output current $I_O$, and a load 148. In the illustrated example, the power converter 100 is shown as having a two-switch forward topology for explanation purposes. It is appreciated that other known topologies and configurations of power converters may also benefit from the teachings of the present disclosure.

In the depicted example, power converter 100 provides output power to the load 148 from an unregulated input voltage $V_{IN}$ 102. In one example, input voltage $V_{IN}$ 102 is a rectified and filtered ac line voltage. In another example, the input voltage $V_{IN}$ 102 is a dc input voltage. The power converter 100 utilizes a two-switch forward topology, which includes two active switches, S1 104 and S2 116, with two passive switches, D1 120 and D2 106, in a configuration that produces primary voltage $V_P$ on the primary winding 110 of energy transfer element T1 114. In the example of FIG. 1, the input voltage $V_{IN}$ 102 has a negative terminal that is common with an input return 108. In one example, energy transfer element T1 114 is a transformer. In another example, energy transfer element T1 114 may be a coupled inductor.

Active switch S1 104 is often referred to as a high side switch because it has one terminal common with the positive terminal of the input voltage $V_{IN}$ 102. Active switch S2 116 is often referred to as a low-side switch because it has one terminal common with the input return 108. Similarly, passive switch D1 120 may also be referred as a high-side switch and passive switch D2 106 may be referred to as a low-side switch.

The positive terminal of input voltage $V_{IN}$ 102 is further coupled to reset circuit 118. As shown in FIG. 1, reset circuit 118 is coupled between input voltage $V_{IN}$ 102 and passive switch D1 120. In the example shown in FIG. 1, passive switch D1 120 is exemplified as a diode and reset circuit 118 is coupled to the cathode of passive switch D1 120. As mentioned above, active switches, S1 104 and S2 116, and passive switches, D1 120 and D2 106, are coupled to energy transfer element T1 114. In the illustrated example, active switch S1 104 and passive switch D2 106 are coupled to one end of energy transfer element T1 114, while active switch S2 116 and passive switch D1 120 are coupled to the other end of energy transfer element T1 114. Further, passive switch D2 106 and active switch S2 116 are coupled to input return 108.

A secondary winding 112 of energy transfer element T1 114 produces a voltage proportional to the primary voltage $V_P$. An output diode 138 is coupled to secondary winding 112 and rectifies the voltage at the secondary winding 112. In the example shown, the secondary winding 112 is coupled to the anode of output diode 138. However, in some examples, a transistor may be used as a synchronous rectifier in place of output diode 138. Both the freewheeling diode 140 and the output inductor L1 142 are coupled to output diode 138. In the example shown, the cathode of freewheeling diode 140 and one end of the output inductor L1 142 are coupled to the cathode of output diode 138. Output capacitor C1 144 is further coupled to the other end of output inductor L1 142 and the anode of freewheeling diode 140. Further, output capacitor C1 144, freewheeling diode 140 and secondary winding 112 are coupled to output return 150, as illustrated.

As shown in the depicted example, load 148 is also coupled across output capacitor C1 144. In the example shown, the output diode 138 rectifies the voltage at the secondary winding 112 and the freewheeling diode 140 provides a path for current in the output inductor L1 142 when the output diode 138 is reverse biased. Further, the output inductor L1 142 and the output capacitor C1 144 filter the rectified voltage from the secondary winding 112 to produce an output quantity $U_O$ at the load 148. The output quantity $U_O$ is provided to the load 148 and may be provided as either an output current $I_O$, output voltage $U_O$, or both.

The secondary winding 112 of energy transfer element T1 114 is typically galvanically isolated from the primary side of power converter 100. That is, a dc voltage between the input return 108 and the output return 150 normally produces substantially zero current between the input return 108 and the output return 150.

As shown in the depicted example, power converter 100 further includes circuitry to regulate the output, which is exemplified as output quantity $U_O$. In the example shown in FIG. 1, a controller 134 receives a feedback signal 146 at feedback terminal 136. The feedback signal 146 is representative of the output quantity $U_O$. In some examples, galvanic isolation is maintained between the input return 108 and output return 150 in the transmission of the feedback signal 146 to the feedback terminal 136. The output quantity $U_O$ may be provided to the controller 134 as feedback signal 146 directly through the use of a circuit, such as an optocoupler. In another example, the output quantity $U_O$ may be provided to the controller 134 from an additional winding of the energy transfer element T1 114.

As shown in the depicted example, controller 134 further receives first current $I_1$ at the reset voltage sensing terminal 128 and a second current $I_2$ at the line voltage, or input voltage, sensing terminal 130. The voltage at the reset voltage sensing terminal 128 and the line voltage sensing terminal 130 are typically low values that are electrically referenced to the input return 108. In one example, the voltages at the reset voltage sensing terminal 128 and at the line voltage sensing terminal 130 are less than approximately three volts, whereas the input voltage $V_{IN}$ is typically between 100 volts and 400 volts. Further, voltages at the reset voltage sensing terminal 128 and at the line voltage sensing terminal 130 may be less than approximately 1.2 volts.

Resistor R2 126 is coupled between the positive terminal of input voltage $V_{IN}$ 102 and the line voltage sensing terminal 130. Second current $I_2$ is substantially directly proportional to the input voltage $V_{IN}$ 102 and inversely proportional to the value of the resistor R2 126. Resistor R1 124 is coupled between the reset circuit 118 and the reset voltage sensing terminal 128. First current $I_1$ is substantially directly proportional to the sum of the input voltage $V_{IN}$ 102 and the reset circuit voltage $V_{RC}$ 122 on the reset circuit 118, and is inversely proportional to the value of the resistor R1 124. For the two-switch forward converter example shown in FIG. 1, the reset voltage $V_{RESET}$ is substantially equal to the sum of the input voltage $V_{IN}$ 102 and the reset circuit voltage $V_{RC}$ 122. As such, first current $I_1$ is substantially directly proportional to the reset voltage $V_{RESET}$. Further, in one example, resistor R1 124 is substantially equal to resistor R2 126. Controller 134 utilizes the signals received at the reset voltage sensing terminal 128, the line voltage sensing terminal 130, and the feedback terminal 136 to produce a gate signal 132 that turns the active switches S1 104 and S2 116 on and off to regulate the output quantity $U_O$ and to prevent saturation of the energy transfer element T1 114 in accordance with the teachings of the present disclosure.

One difference between an active switch and a passive switch is that the active switch receives a control signal that opens and closes the switch whereas a passive switch does not receive a control signal. An open switch does not normally conduct current. A closed switch may conduct current. Active switches typically have one or more control terminals that determine whether or not the two other terminals of the active switch may conduct current. In the example of FIG. 1, a gate signal 132 opens and closes active switches S1 104 and S2 116. In practice, switches S1 104 and S2 116 are typically semiconductor devices such as for example metal oxide semiconductor field effect transistors (MOSFETs), or for example bipolar junction transistors (BJTs), or for example insulated gate bipolar transistors (IGBTs).

Passive switches generally have only two terminals. Typically, the voltage between the terminals determines whether a passive switch is open or closed. A diode is sometimes considered a passive switch, since it conducts current when the voltage between its two terminals has one polarity (anode positive with respect to cathode), and it substantially blocks current when the voltage between the terminals has the opposite polarity (anode negative with respect to cathode). The passive switches D1 120 and D2 106 in the example of FIG. 1 are PN junction diodes.

As mentioned above, the controller 134 utilizes the signals received at the reset voltage sensing terminal 128, the line voltage sensing terminal 130, and the feedback terminal 136 to produce a gate signal 132 that turns the active switches S1 104 and S2 116 on and off to regulate the output quantity $U_O$ and to prevent saturation of the energy transfer element T1 114. In the two-switch forward converter example illustrated in FIG. 1, magnetic flux increases in the energy transfer element T1 114 when the active switches S1 104 and S2 116 are turned on, and the magnetic flux decreases in the energy transfer element T1 114 when the active switches S1 104 and S2 116 turn off. The magnetic flux is associated with a magnetizing current that enters the windings of the energy transfer element when the active switches S1 104 and S2 116 are on. When the active switches S1 104 and S2 116 turn off, the magnetizing current leaves the primary winding of the energy transfer element T1 114 through the passive switches D1 120 and D2 106. A reset circuit 118 produces a reset circuit voltage $V_{RC}$ 122 from the magnetizing current that leaves the energy transfer element T1 114 through passive switches D1 120 and D2 106.

In the illustrated example, the magnetic flux increases and decreases at rates that are proportional to the voltage $V_P$ on the primary winding 110. Therefore, when the active switches S1 102 and S2 116 are on, the magnetic flux increases at a rate substantially proportional to the input voltage $V_{IN}$ 102. Similarly, when passive switches D1 120 and D2 106 are on, the magnetic flux decreases at a rate substantially proportional to the sum of the input voltage $V_{IN}$ 102 and the reset circuit voltage $V_{RC}$ 122. The voltage on the primary winding 110 when the passive switches D1 120 and D2 106 are on may be referred to as the reset voltage $V_{RESET}$ (i.e., the reset voltage $V_{RESET}$ is the sum of the input voltage $V_{IN}$ 102 and the reset circuit voltage $V_{RC}$ 122 when the passive switches D1 120 and D2 106 are on, or mathematically: $V_{RESET}=V_{IN}V_{RC}$).

Energy transfer element T1 114 is typically constructed with magnetic material to achieve the desired coupling between primary winding 110 and secondary winding 112. The magnetic material of the energy transfer element T1 114 normally loses desirable properties if the magnetic flux reaches a saturation value. To prevent saturation, the amount by which the magnetic flux decreases when the passive switches D1 120 and D2 16 are on should equal the amount by which the magnetic flux increased when the active switches S1 104 and S2 116 are on. In accordance with the present disclosure, the magnetic flux in the transformer is prevented from reaching its saturation value.

Although it is possible to measure the magnetic flux directly in the energy transfer element T1 114, methods of doing so are typically not practical for low cost power supply applications. In contrast, examples in accordance with the present disclosure use a simple indirect technique to indicate the magnitude of the magnetic flux. The change in magnetic flux is proportional to the time integral of the voltage on any winding of the energy transfer element T1 114. Knowledge of the change in the magnetic flux during a switching period is normally sufficient to prevent the magnetic flux from reaching its saturation value. As mentioned above, to prevent saturation, the amount by which the magnetic flux decreases when the passive switches D1 120 and D2 16 are on should equal the amount by which the magnetic flux increases when the active switches S1 104 and S2 116 are on. In other words, the following equation should be satisfied to prevent magnetic flux build up:

$$|V_{P(on)}|T_{ON} \le |V_{P(off)}|T_{OFF} \quad (1)$$

where $V_{P(ON)}$ is the voltage on the primary winding 110 during the on-time $T_{ON}$, or in other words, the time when active switches S1 104 and S2 116 are on, and $V_{P(OFF)}$ is the voltage on the primary winding 110 during the off-time $T_{OFF}$, or in other words, the time when the passive switches D1 120 and D2 16 are on. Thus, during the on-time $T_{ON}$, the voltage on the primary winding 110 is substantially equal to the input voltage $V_{IN}$ 102 while during the off-time $T_{OFF}$ the voltage on the primary winding 110 is substantially equal to the reset voltage $V_{RESET}$. Further, the off-time $T_{OFF}$ may be expressed in terms of the on-time $T_{ON}$ and the switching period $T_S$ and equation (1) may be rewritten as:

$$|V_{P(on)}|T_{ON} \le |V_{P(off)}|T_{OFF} \quad (2)$$

Management of the magnetic flux to prevent saturation of the energy transfer element may be achieved by controlling the on-time $T_{ON}$ such that the inequality of equation (2) is satisfied. Examples in accordance with the teachings of the present disclosure compare the time integral combination of the input voltage $V_{IN}$ 102 and the reset voltage $V_{RESET}$ over the on-time $T_{ON}$ to the time integral of the reset voltage $V_{RESET}$ over the switching period $T_S$. Or mathematically:

$$\int_0^{TON}(V_{IN}+V_{RESET})dt \le \int_0^{TS}V_{RESET}dt \quad (3)$$

For the example shown in FIG. 1, the reset voltage $V_{RESET}$ is the sum of the input voltage $V_{IN}$ 102 and the reset circuit voltage $V_{RC}$ 122 (i.e., $V_{RESET}=V_{IN}+V_{RC}$). As mentioned above, the first current $I_1$ is substantially proportional to the input voltage $V_{IN}$ 102 plus the reset circuit voltage $V_{RC}$ 122 (in other words, the reset voltage $V_{RESET}$ for the example converter shown) while the second current $I_2$ is substantially proportional input voltage $V_{IN}$ 102. Equation (3) may be rewritten in terms of first current $I_1$ and second current $I_2$ (with resistor R1 equal to resistor R2):

$$\int_0^{TON}(I_2+I_1)dt \le \int_0^{TS}I_1 dt \quad (4)$$

In other words, examples in accordance with the teachings of the present disclosure compare the time integral of the sum of first current $I_1$ and second current $I_2$ over the on-time $T_{ON}$ to the time integral of the first current $I_1$ over the switching period $T_S$. As will be further discussed, if the value time integral of the sum of first current $I_1$ and second current $I_2$ over the on-time $T_{ON}$ equals the time integral of the first current $I_1$ over the switching period $T_S$, the controller 134 turns off active switches S1 104 and S2 116 through gate signal 132 in accordance with the teachings of the present disclosure. As will be discussed, in one example, the time integral of the first current $I_1$ over a switching period $T_S$ may be determined using a previous switching cycle in accordance with the teachings of the present disclosure.

Figure 2:
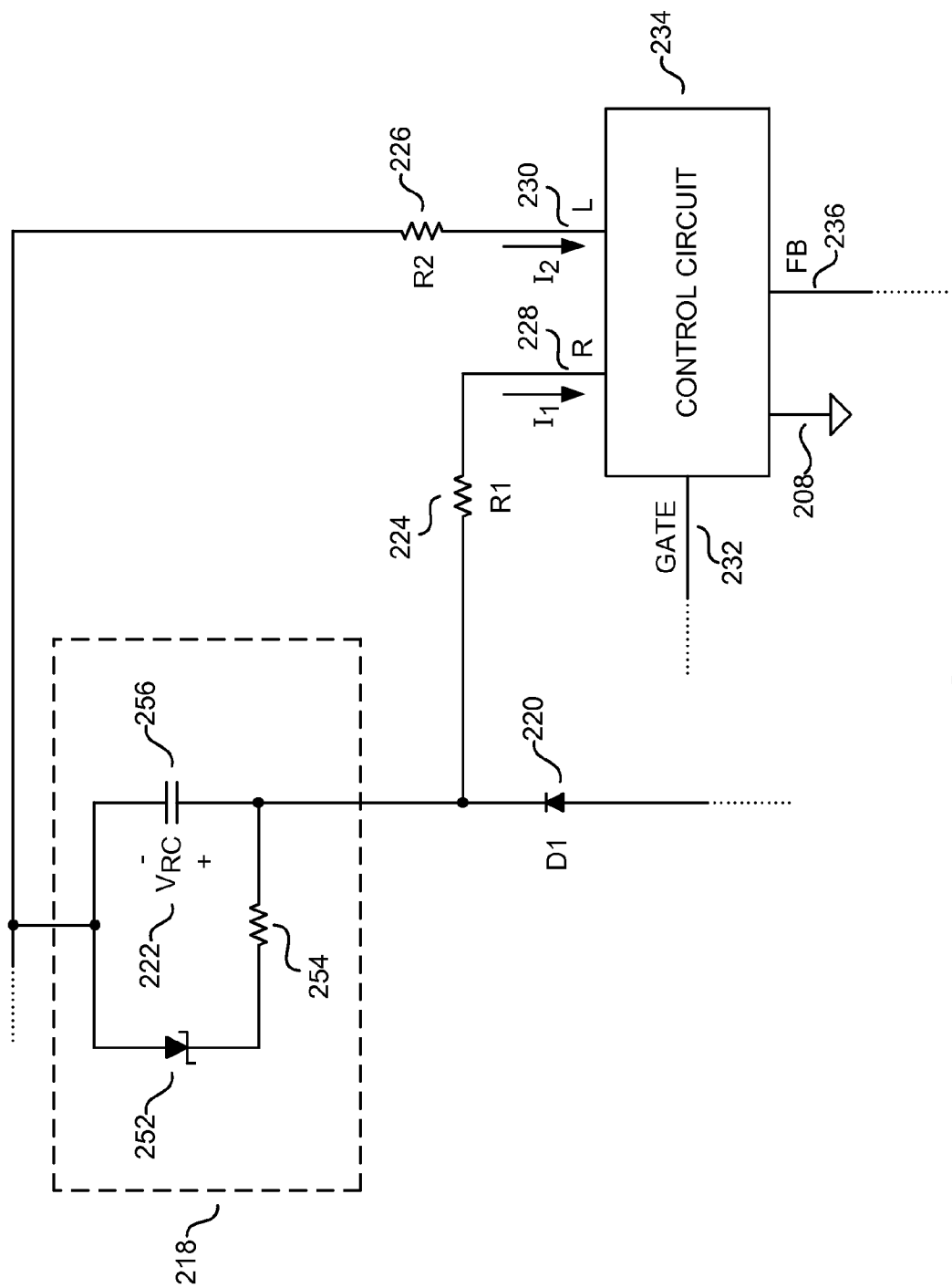
FIG. 2 is a schematic diagram illustrating an example reset circuit, in accordance with teachings of the present disclosure.

FIG. 2 illustrates an example reset circuit 218, which is one example of reset circuit 118 shown in FIG. 1. The reset circuit 218 includes Zener diode 252, resistor 254, and capacitor 256 coupled as shown. Reset circuit voltage $V_{RC}$ 222 is the voltage across the capacitor 256. Further shown in FIG. 2 is input return 208, passive switch D1 220, resistor R1 224, resistor R2 226, reset voltage sensing terminal 228, first current $I_1$, line voltage sensing terminal 230, second current $I_2$, gate signal 232, control circuit 234, and feedback terminal 236.

In operation, active switches S1 and S2, as shown for example in FIG. 1 turn on for a portion of a switching period $T_S$. This portion of the switching period $T_S$ is referred to as the on-time $T_{ON}$. The active switches S1 and S2 are off for the remainder of the switching period $T_S$. The ratio between the on-time $T_{ON}$ and the switching period $T_S$ is referred to as the duty ratio D. A two-switch forward converter using a symmetrical reset circuit has a maximum duty ratio of 50% to ensure that the increase in magnetic flux when the active switches are on is the same as the decrease in magnetic flux when the active switches are off. In other words, the active switches are not normally closed for more than half the time in a complete switching period for repetitive switching cycles in a two-switch forward converter that does not use a reset circuit.

A two-switch forward converter that uses a reset circuit 218 can extend the maximum duty ratio beyond 50%. The ability to operate at a larger duty ratio has the benefit of permitting operation over a wider range of input voltages. Another advantage of the extended duty ratio is the reduction in RMS (root-mean-square) and peak current in the active switches S1 and S2, thereby reducing conduction loss and raising efficiency.

The reset circuit 218 illustrated in the example of FIG. 2 develops a reset circuit voltage $V_{RC}$ 222 that is substantially constant for several switching cycles. The capacitor 256 is coupled between the positive terminal of input voltage $V_{IN}$ and passive switch D1 220. As shown, Zener diode 252 and resistor 254 are coupled across capacitor 256. The current from the high-side passive switch D1 220 establishes the reset circuit voltage $V_{RC}$ 222 on capacitor 256 between the positive terminal of the input voltage $V_{IN}$ 102 and the high-side passive switch D1 110. The Zener diode 252 generally limits the voltage on the capacitor 256.

Figure 3:
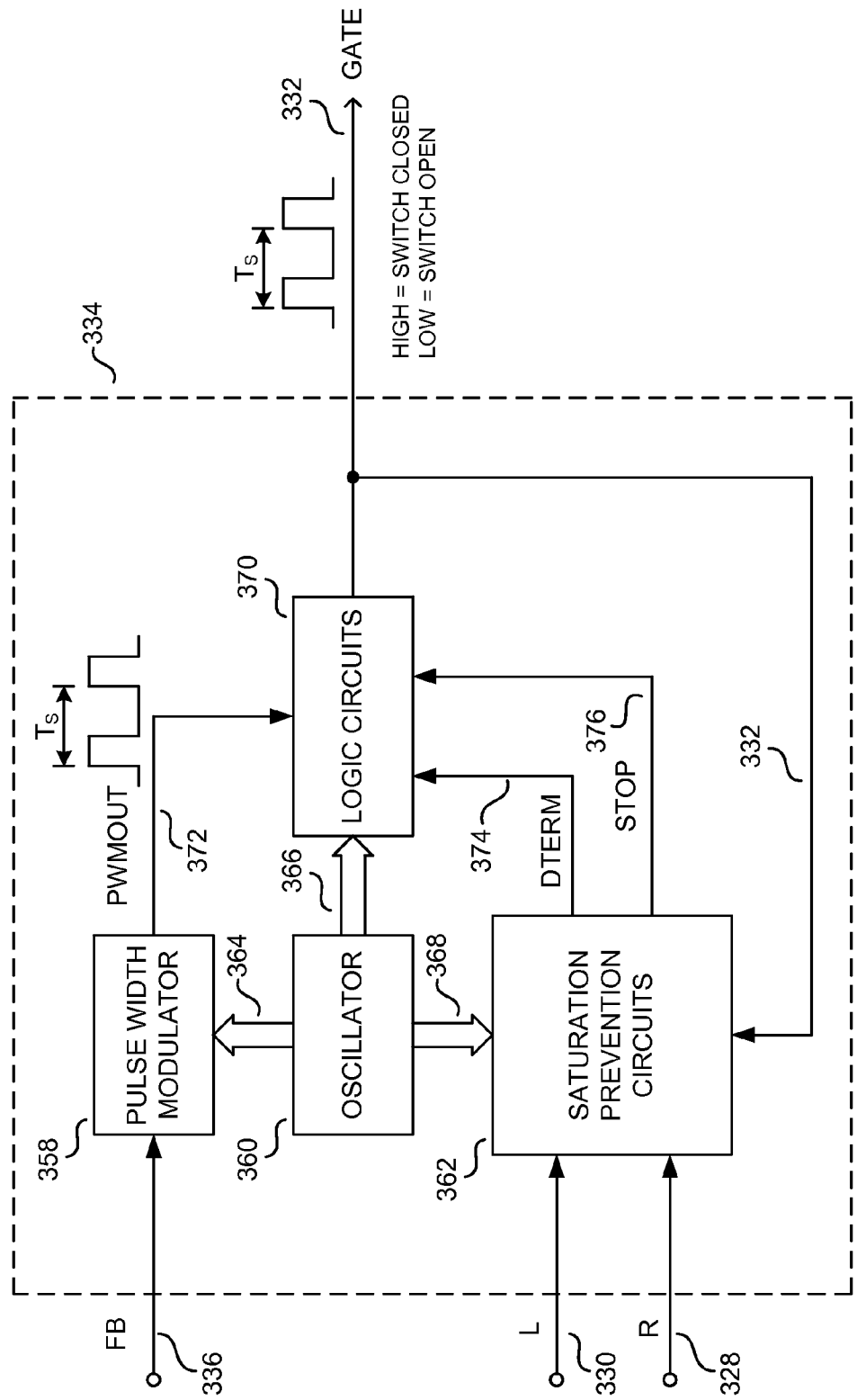
FIG. 3 is an example functional block diagram of a controller, in accordance with teachings of the present disclosure.

FIG. 3 illustrates a functional block diagram 300 of an example controller 334, which is one example of controller 134 shown in FIG. 1. Functional block diagram 300 is also one example of controller 1034 shown in FIG. 10. As shown in the depicted example, controller 334 includes pulse width modulator (PWM) 358, oscillator 360, saturation prevention circuits 362, logic circuits 370, feedback terminal 336, reset voltage sensing terminal 328, line sensing terminal 330, and a terminal to output the gate signal 332. Further illustrated in FIG. 3 are PWMOUT signal 372, DTERM signal 374, STOP signal 376, and timing signals 364, 366, and 368 from oscillator 360.

The output of the controller 334 is gate signal 332, which in one example opens and closes the active switches S1 104 and S2 116 shown for example in FIG. 1. In one example, the active switches S1 104 and S2 116 are closed (i.e., ON) when the gate signal 332 is a logic high value and the active switches S1 104 and S2 116 are open (i.e., OFF) when the gate signal 332 is at a logic low value. In one example, gate signal 332 is a rectangular pulse waveform with varying lengths of logic high and logic low values. In a further example, the amount of time between rising edges of the gate signal 332 is substantially the switching period $T_S$.

An oscillator 360 is coupled to provide timing signals 364, 366, and 368 to the pulse width modulator 358, logic circuits 370, and saturation prevention circuits 362, respectively. In one example, gate signal 332 is responsive to timing signals 364, 366, and 368, which may provide timing information, such as the length of the switching period $T_S$, to the PWM 358, logic circuits 370 and saturation prevention circuits 362. In one embodiment, timing signals 364, 366, and 368 are rectangular pulse waveforms with fixed lengths of logic high and logic low sections. In a further example, the amount of time between rising edges (or falling edges) is substantially the switching period $T_S$.

As shown in the example of FIG. 3, the PWM 358 is also coupled to receive the feedback signal at the feedback terminal 336. As mentioned above, the feedback signal is representative of the output quantity $U_O$ of the power supply. The PWM 358 responds to the signal at the feedback terminal 336 to produce a PWMOUT signal 372. PWMOUT signal 372 is a rectangular pulse waveform with varying lengths of logic high and logic low sections. The PWMOUT signal 372 is a timing signal having switching period $T_S$ and a duty ratio required to regulate an output quantity $U_O$ of the power supply. In one example, the length of the logic high sections of the PWMOUT signal 327 corresponds to the desired on-time $T_{ON}$ of the active switches S1 104 and S2 116 to regulate an output quantity $U_O$ of the power supply.

In one example, saturation prevention circuits 362 are coupled to receive signals from line voltage sensing terminal 330 and reset voltage sensing terminal 328. Further, saturation prevention circuits 362 are also coupled to receive the gate signal 332 from logic circuits 370. As shown in FIG. 3, saturation prevention circuits 362 are coupled to logic circuits 370. The saturation prevention circuits 362 produce the STOP signal 376, which is received by logic circuits 370. In the example shown in FIG. 3, the saturation prevention circuits 362 may optionally also produce the DTERM signal 374, which is also received by logic circuits 370. Logic circuits 370 process the signals received from the saturation prevention circuits 362 and PWM 358 to produce the gate signal 332. In one example, the logic circuits 370 processes the DTERM 374 and STOP 376 signals to determine whether or not to inhibit the PWMOUT signal 372 to prevent saturation of the energy transfer element T1 114. When the STOP 376 signal is asserted, the active switches S1 104 and S2 116 are turned off immediately because the inequality of equation (1) and (2) has not been met. When the DTERM 374 signal is asserted, the active switches S1 104 and S2 116 are turned off immediately because the magnetic flux in the transformer T1 114 is at its highest desired value.

As will be further illustrated, under normal operation, the gate signal 332 is substantially the PWMOUT signal 372. However, if either the DTERM 374 or STOP 376 signals are asserted, the gate signal 332 will fall to a logic low value to turn off active switches S1 104 and S2 116 before the PWMOUT signal 372 has fallen to a logic low value.

Figure 4:
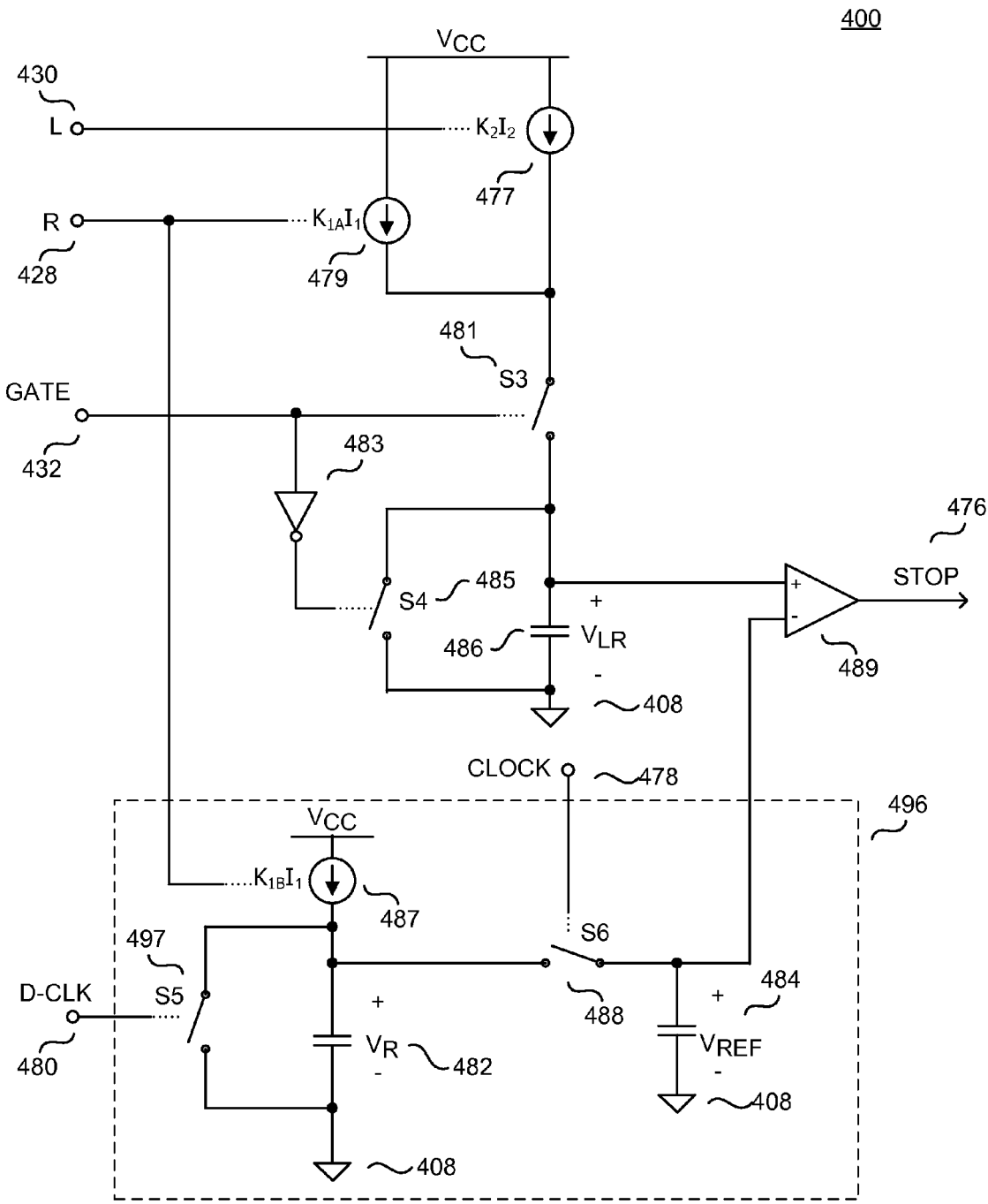
FIG. 4 is a schematic diagram illustrating an example saturation prevention circuit, in accordance with teachings of the present disclosure.

FIG. 4 illustrates an example saturation prevention circuit 400, which is one example of saturation prevention circuits 362 of FIG. 3. As shown in the example depicted in FIG. 4, saturation prevention circuit 400 includes input return 408, reset voltage sensing terminal R 428, line sensing, or input voltage sensing, terminal L 430, gate signal GATE 432, a CLOCK signal 478, a D-CLK signal 480, STOP signal 476, a current source 477 with current $K_2I_2$, a current source 479 with current $K_{1A}I_1$, a switch S3 481, a switch S4 485, inverter 483, capacitor 486 with voltage $V_{LR}$, comparator 489, and a reference generation circuit 496. Reference generation circuit 496 further includes a current source 487 with current $K_{1B}I_1$, a switch S5 497, a switch S6 488, a capacitor 482 with voltage $V_R$ and a capacitor 484 with reference voltage $V_{REF}$. Saturation prevention circuit 400 may optionally include circuitry to produce a DTERM signal but are not shown to prevent obscuring the present embodiments.

As shown in FIG. 4, current source 477 is a controlled current source that is coupled to be responsive to the current received by the line voltage sensing terminal L 430. The value of the current source 477 is directly proportional to the current $I_2$ received at the line voltage sensing terminal L 430, which is representative of the input voltage of the power converter. As illustrated, current source 477 provides a current with value $K_2I_2$. Current source 479 is also a controlled current source that is coupled to be responsive to the current received the reset voltage sensing terminal R 428. The value of current source 479 is directly proportional to current $I_1$ received at the reset voltage sensing terminal R 428, which is representative of the reset voltage $V_{RESET}$. For the example shown, current source 479 is directly proportional to the sum of the input voltage $V_{IN}$ 102 and the reset circuit voltage $V_{RC}$ 122. As illustrated, current source 470 provides a current with value $K_{1A}I_1$.

Current sources 477 and 479 are coupled to switch S3 481 and capacitor 486 such that the capacitor 486 is charged with a combination of the currents provided by current sources 477 and 479 when switch S3 481 is closed. In other words, one end of switch S3 481 is coupled to current sources 477 and 479 while the other end of switch S3 481 is coupled to capacitor 486. In the illustrated example, the combination of the currents provided by current sources 477 and 479 is the sum of the currents provided by current sources 477 and 479. In the illustrated example, capacitor 486 is further coupled to input return 408. The voltage across capacitor 486 is denoted as voltage $V_{LR}$. Switch S3 481 is coupled to receive gate signal GATE 432 and opens closes in response to the gate signal GATE 432. Capacitor 486 is further coupled to the non-inverting terminal of comparator 489 such that the comparator 489 receives the voltage $V_{LR}$.

Further shown in FIG. 4 is switch S4 485, which is coupled across capacitor 486. The output of inverter 483 is coupled to the switch S4 485. As shown, the inverter 483 receives the gate signal 432 and the switch S4 is opened and closed in response to an inverted gate signal. In one embodiment, when switch S3 is open, switch S4 is closed and vice versa. Thus, in one example, capacitor 486 is discharged through switch S4 when the active switches (S1 and S2 shown in FIG. 1) are turned off in response to gate signal 432. In another example, capacitor 486 is discharged through switch S4 at an end of a switching cycle in response to gate signal 432.

As shown in the depicted example, saturation prevention circuit 400 further includes reference generation circuit 496. Current source 487 is a controlled current source coupled to be responsive to the current received at the reset voltage sensing terminal R 428, which is representative of the reset voltage $V_{RESET}$. The value of current source 487 is directly proportional to current $I_1$ received at the reset voltage sensing terminal R 428. As illustrated, current source 470 provides a current with value $K_{1B}I_1$. In one example, the current provided by current source 479 is substantially equal to the current provided by current source 487.

Current source 487 further couples to capacitor 482 and switch S5 497. Switch S5 497 and capacitor 482 are further coupled to input return 408. In one example, the value of capacitor 482 is substantially equal to the value of capacitor 486. Switch S5 497 is coupled to receive the D-CLK signal 480 and opens and closes in response to the D-CLK signal 480. In one example, D-CLK signal 480 is a rectangular pulse waveform with varying lengths of logic high and logic low sections. Further, the D-CLK signal 480 may be a delayed version of CLOCK signal 478. As will be further illustrated, in one example the D-CLK signal 480 pulses to a logic high value and quickly falls to a logic low value. Switch S5 497 is coupled across capacitor 482 such that the capacitor 482 is charged by current source 487 when switch S5 497 is open. The voltage across capacitor 482 is denoted as voltage $V_R$.

Further included in reference generation circuit 496 is switch S6 488 and capacitor 484. Capacitor 484 and switch S6 488 may be referred to as a sample and hold circuit. Switch S6 488 is coupled to capacitor 482 to sample and hold the value of capacitor 482 (voltage $V_R$ at the time of sampling) to capacitor 484 as reference voltage $V_{REF}$ 484. Switch S6 is opened and closed in response to the CLOCK signal 478. In one example, capacitor 482 is discharged through switch S5 after the reference voltage $V_{REF}$ is stored in the reference capacitor 484 from the second integrating capacitor 482. In one example, the CLOCK signal 478 is a rectangular pulse waveform with varying lengths of logic high and logic low sections. In one example, the CLOCK signal 478 is a pulse waveform with the time between leading edges is substantially equal to the switching period $T_S$. The D-CLK signal 480 may be a delayed version of the CLOCK signal 478. As such, D-CLK signal 480 is also a pulse waveform with the time between leading edges substantially equal to the switching period $T_S$. In one example, the value of capacitor 482 is much larger than the value of capacitor 484. However, the values of capacitor 482 and capacitor 484 may be adjusted to determine how quickly the charge of capacitor 482 is transferred to capacitor 484. For example, the values of capacitor 482 and 484 may be selected such that it takes several switching cycles for $V_R$ to be transferred as $V_{REF}$. This would prevent the sampling of unwanted transient conditions (such as spikes in the input voltage). Further, an optional buffer may be included to facilitate the sample and hold of capacitor 482. In another embodiment of the reference generation circuit, the current source 487 may be coupled to charge both capacitor 482 and capacitor 484 through switches. In addition, both capacitors 482 and 484 are coupled to the comparator 489 through switches and may alternatingly provide the reference voltage $V_{REF}$. The switches would be controlled such that while one capacitor was being charged by current source 487, the other capacitor is providing the reference voltage $V_{REF}$ and vice versa.

In the example illustrated, the reference voltage $V_{REF}$ across capacitor 484 is updated every switching period $T_S$. The output of the sample and hold circuit (i.e., the reference voltage $V_{REF}$) is coupled to and received by the inverting input of comparator 489. Comparator 489 compares the reference voltage $V_{REF}$ to the voltage $V_{LR}$ on capacitor 486 to output the STOP signal 476. STOP signal 476 may be a rectangular pulse waveform with varying lengths of logic high and logic low sections.

Figure 5:
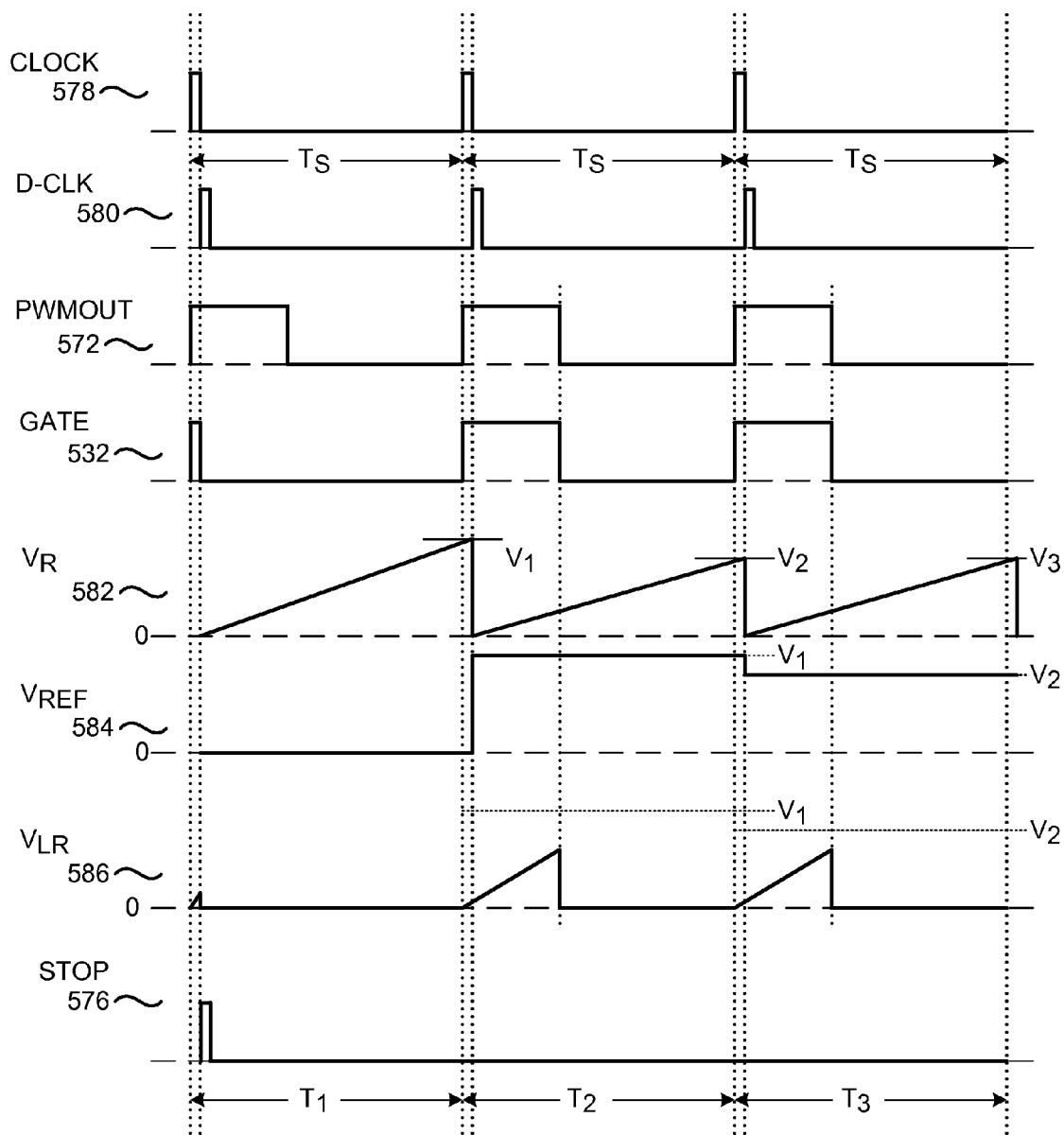
FIG. 5 is a timing diagram illustrating example signals of the example saturation prevention circuit of FIG. 4 for a start-up and normal operation, in accordance with teachings of the present disclosure.
Figure 6:
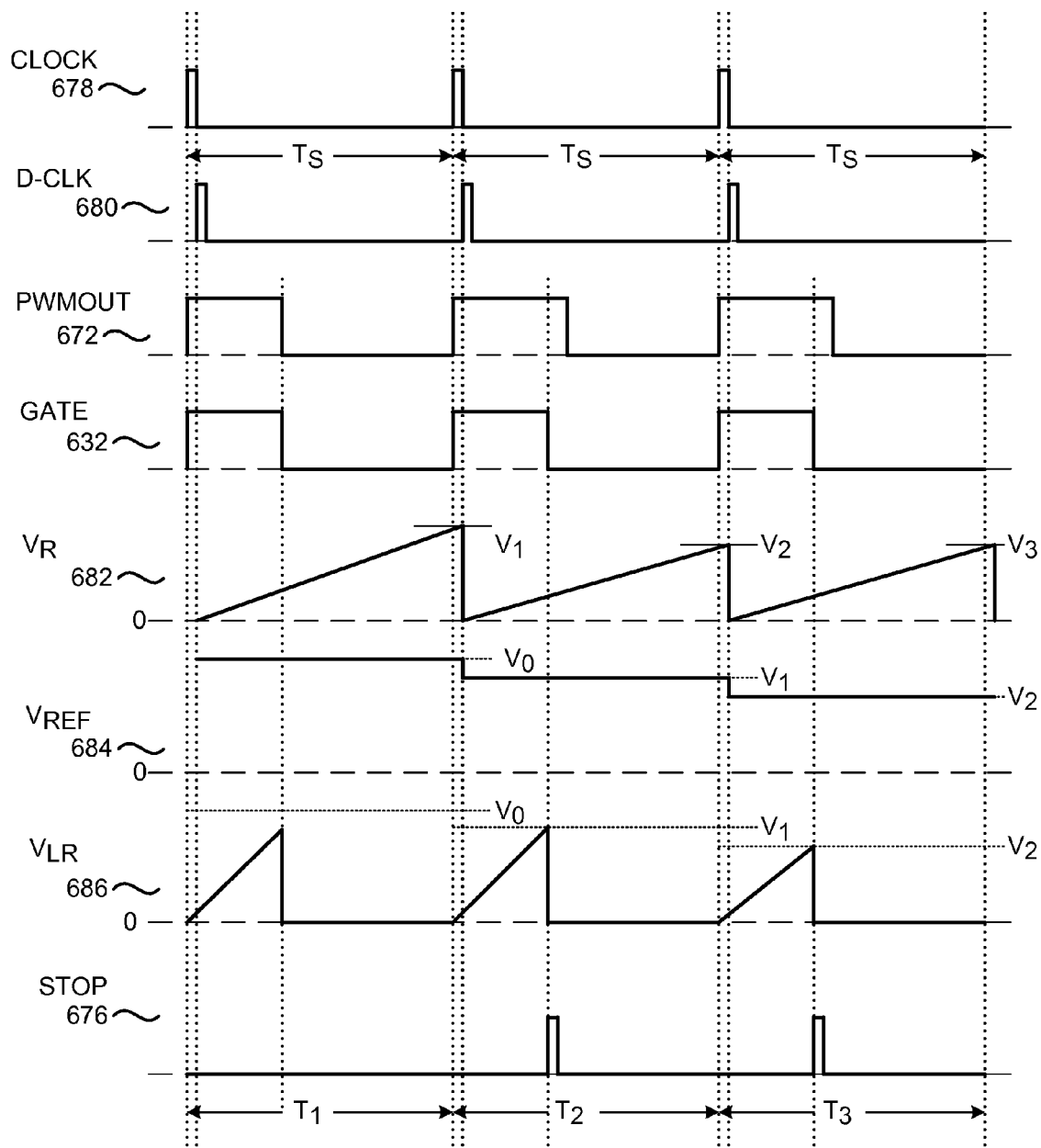
FIG. 6 is timing diagram illustrating example signals of the example saturation prevention circuit of FIG. 4 for a condition that terminates a gate signal to prevent saturation of an energy transfer element, in accordance with teachings of the present disclosure.

In operation, and as will be further discussed with respect to FIGS. 5 and 6, the capacitor 486 is charged by the combination of the currents provided by current sources 477 and 479 when switch S3 481 is closed and when switch S4 485 is open. In one example, the combination of the currents provided by current sources 477 and 479 is the sum of the currents provided by current sources 477 and 479. In one example, switch S3 481 is closed when active switches S1 and S2 are closed. In other words, capacitor 486 is charged with the sum of the first current $I_1$ and the second current $I_2$. As such, the capacitor 486 integrates the sum of the first current $I_1$ and the second current $I_2$ over the on-time $T_{ON}$. The resultant voltage on capacitor 486 is received by the comparator 489 as voltage $V_{LR}$. The voltage $V_{LR}$ across capacitor 486 represents the left side of the inequality of equation (4) shown above. Switch S4 485 is closed and switch S3 481 is open when the passive switches D1 and D2 are conducting. As such, capacitor 486 discharges and the voltage across capacitor 486 falls to zero. In another example, the voltage across capacitor 486 discharges to some predetermined value.

In one example, capacitor 482 is charged by current source 487 for the entire switching period $T_S$. In other words, the capacitor 482 integrates the first current $I_1$ over the switching period $T_S$. As shown, switch S6 488 samples the voltage $V_R$ on capacitor 482 at the end of the switching period $T_S$ and holds the value on capacitor 484 as reference voltage $V_{REF}$. After the voltage $V_R$ is sampled, switch S5 is closed to quickly discharge the capacitor 482. As will be further explained, the reference generation circuit 496 generates the reference voltage $V_{REF}$ which will be compared to the voltage $V_{LR}$ for the next switching cycle.

The reference voltage $V_{REF}$ 484 from a previous switching cycle is compared to the voltage $V_{LR}$ on capacitor 486. If the voltage $V_{LR}$ reaches the reference voltage $V_{REF}$ while switch S3 481 is closed, the output of comparator 489 (i.e., STOP signal 476) pulses to a logic high value, which turns off the active switches to prevent saturation in the energy transfer element in accordance with the teachings of the present disclosure.

FIG. 5 is a timing diagram 500 illustrating example signals of the saturation prevention circuit of FIG. 4 for a start-up and normal operation, in accordance with teachings of the present disclosure. As shown in example, CLOCK 578 pulses at the beginning of each switching cycle $T_S$. D-CCLK 580 pulses each switching cycle after each pulse of CLOCK 578. In the example, the PWMOUT 572 signal generated by the PWM 358 and is logic high and logic low during each switching cycle. In the illustrated example, PWMOUT signal 572 is logic high at the beginning of each switching cycle (T1, T2, and T3). As such the GATE 532 signal is also logic high at the beginning of each switching cycle. Further, the GATE signal 532 substantially follows the PWMOUT 572 signal unless the STOP 576 signal transitions to a logic high value. Timing diagram 500 also shows that the capacitor 482 is charged during each switching cycle the voltage $V_R$ 582 increases. The capacitor 482 is discharged when the D-CLK 580 pulses to a logic high value during each switching cycle and the voltage $V_R$ 582 falls to zero.

In the illustrated example, the reference voltage $V_{REF}$ 584 is the value of $V_R$ 582, which was sampled and held from a previous switching cycle. For instance, as shown in the depicted example, during switching cycle T2, the value of $V_{REF}$ 584 is V1, which was the value that $V_R$ 582 reached during the previous T1 switching cycle. Similarly, during switching cycle T3, the value of $V_{REF}$ 584 is V2, which was the value that $V_R$ 582 reached during the previous T2 switching cycle. The voltage $V_R$ 582 is sampled to capacitor 484 as reference voltage $V_{REF}$ 584 when the CLOCK signal 578 pulses to a logic high value. When D-CLK signal 580 pulses to a logic high value, the capacitor 482 is discharged and the voltage $V_R$ 582 quickly falls to zero. Once D-CLK signal 580 transitions to a logic low value, the voltage $V_R$ 582 begins to increase for the entire switching period.

The switching period T1 illustrates an example start up cycle of the power converter. During switching period T1, the value of $V_{REF}$ 584 is substantially zero and the value of capacitor 486 (i.e., $V_{LR}$ 586) is compared to the $V_{REF}$ 584. Since $V_{REF}$ 584 is substantially zero, the voltage $V_{LR}$ 586 increases only for a short amount of time before the STOP signal 576 transitions to a logic high value. Since the STOP signal 576 is asserted, the GATE signal 532 transitions to a logic low value which discharges capacitor 486 and voltage $V_{LR}$ 586 falls to zero (in addition, the active switches S1 and S2 are turned off). As shown in FIG. 5, the GATE signal 532 transitions to a logic low value when the STOP signal 576 is asserted in switching period T1. However, during switching period T1, the voltage $V_R$ 582 increases to the value V1. The value V1 is sampled and held as reference voltage $V_{REF}$ 584 which is utilized in the next switching period T2.

Switching periods T2 and T3 illustrate the various waveforms of the saturation prevention circuits under normal operation and the STOP signal 576 does not transition to a logic high value during the switching cycle. At the beginning of both switching cycle T2 and T3, the PWMOUT signal 572 and the GATE signal 532 increase to a logic high value. As such, the switch S3 481 is closed and voltage $V_{LR}$ 586 increases. The voltage $V_{LR}$ 586 does not reach the value of the reference voltage $V_{REF}$ (value V1 and V2 for switching period T2 and T3, respectively), while the GATE signal 532 is logic high. As such, the STOP signal 576 remains logic low and the PWMOUT signal 572 determines when the GATE signal 532 transitions to a logic low value. As shown in T2 and T3, the GATE signal 532 falls to a logic low value when the PWMOUT signal 572 falls to a logic low value. Switch S4 485 is closed and the capacitor 486 discharges and voltage $V_{LR}$ 586 falls to a logic low value.

In contrast, FIG. 6 is timing diagram 600 illustrating example signals of the saturation prevention circuit of FIG. 4 for a condition, which terminates a gate signal to prevent saturation of an energy transfer element, in accordance with teachings of the present disclosure. It is appreciated that the signals illustrated in FIG. 6 are similar to the similarly numbered signals in FIG. 5. In particular, CLOCK 678 pulses at the beginning of each switching cycle T1, T2 and T3. D-CLK 680 pulses each switching cycle after each pulse of CLOCK 678. In the example, the PWMOUT 672 signal generated by the PWM 358 is logic high and logic low during each switching cycle. In the illustrated example, the PWMOUT 672 signal is a logic high value at the beginning of each switching cycle (T1, T2, and T3). As such, the GATE 632 signal is also logic high at the beginning of each cycle (T1, T2 and T3), but the GATE signal 632 transitions to a logic low value (and subsequently turning off the active switches S1 and S2) when the STOP 676 signal pulses to a logic high value as shown. Timing diagram 600 also shows that the capacitor 482 is charged during each switching cycle and the voltage $V_R$ 682 increases. The capacitor 482 discharges when the D-CLK 680 pulses to a logic high value during each switching cycle and the voltage $V_R$ 582 falls to zero.

Similar to the example illustrated in FIG. 5, reference voltage $V_{REF}$ 684 is the value of $V_R$ 682, which was sampled and held from a previous switching cycle. For instance, as shown in the depicted example, during switching cycle T2, the $V_{REF}$ 684 value is V1, which was the value that $V_R$ 682 reached during the previous T1 switching cycle. Similarly, during switching cycle T3, the $V_{REF}$ 684 value is V2, which was the value that $V_R$ 682 reached during the previous T2 switching cycle. During switching cycle T1, the value of $V_{REF}$ 684 is V0, which was the value that $V_R$ 682 reached during the previous switching cycle (not shown). As mentioned above, the value on capacitor 482 (i.e., voltage $V_R$ 682) is sampled then held as reference voltage $V_{REF}$ 684 on capacitor 484 when the CLOCK signal 678 pulses to a logic high value. When D-CLK signal 680 pulses to a logic high value, the capacitor 482 is discharged and the voltage $V_R$ 682 quickly falls to zero. Once D-CLK signal 680 transitions to a logic low value from the logic high value, the voltage $V_R$ 682 begins to increase.

The depicted example also shows that the $V_{LR}$ 686 voltage increases during each switching cycle while the GATE 632 signal is logic high and decreases when the GATE 632 signal is logic low during every switching cycle (corresponding to the charging and discharging of capacitor 486 shown in FIG. 4). As shown in FIG. 6, $V_{LR}$ 686 falls to zero when the GATE 632 transitions from a logic high to a logic low value. During switching cycle T1, the value of $V_{LR}$ 686 does not reach the reference voltage 684 while the GATE signal 632 is logic high. As such, the PWMOUT signal 672 determines when the GATE 632 signal falls to a logic low value (and subsequently turning off the active switches S1 and S2).

However, during switching cycles T2 and T3, the value of $V_{LR}$ 686 reaches the reference voltage $V_{REF}$ 684 (value V1 and V2 for switching cycles T2 and T3, respectively), the STOP 676 signal is asserted (i.e., the output of comparator 489 is a logic high value) and the GATE 632 signal falls to a logic low value subsequently turning off the active switches S1 and S2 for the remainder of the switching cycle, which helps to prevent saturation in the energy transfer element of the power converter in accordance with the teachings of the present disclosure.

Figure 7:
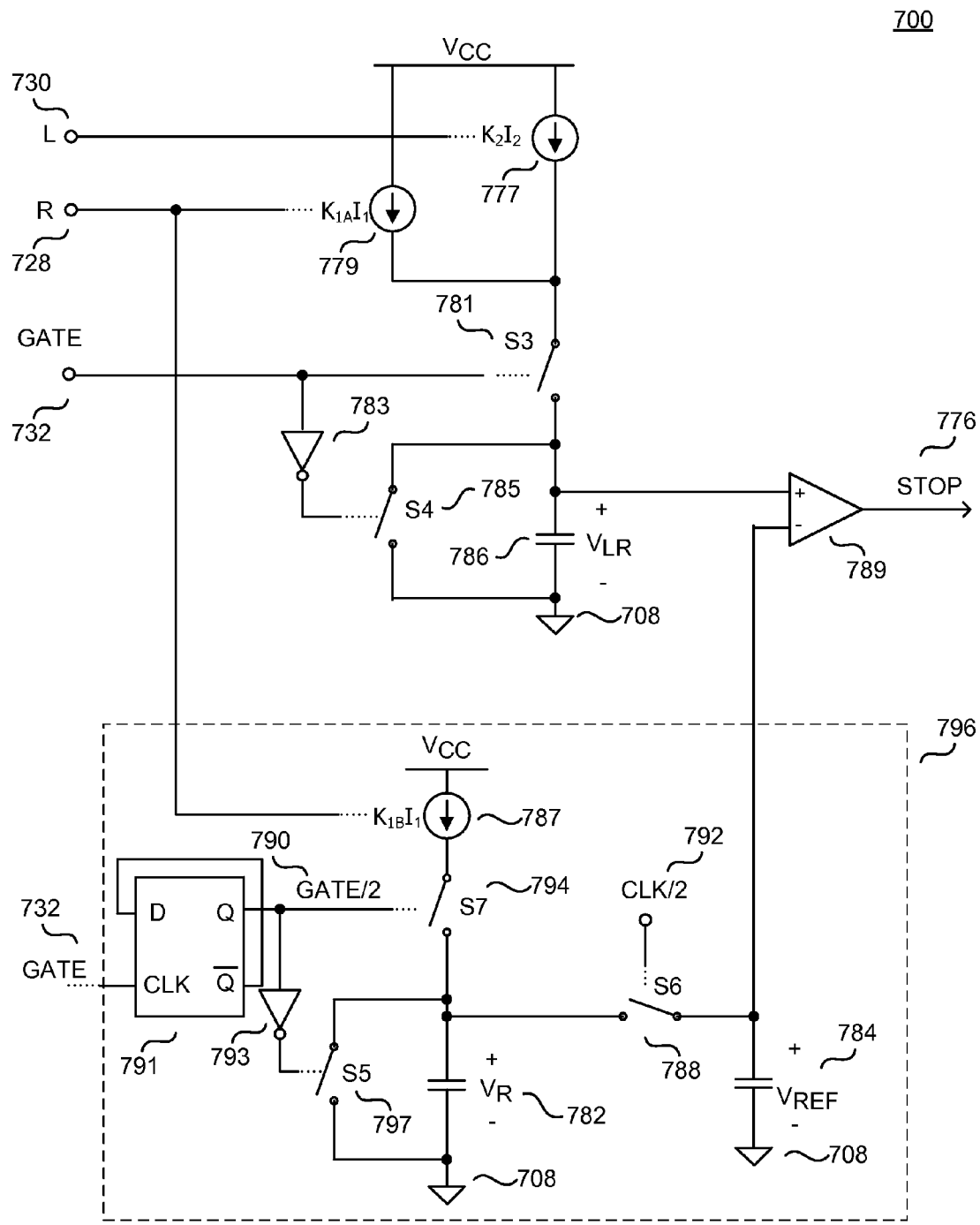
FIG. 7 is a schematic diagram illustrating another example saturation prevention circuit, in accordance with teachings of the present disclosure.

FIG. 7 illustrates an example saturation prevention circuit 700, which is another example of saturation prevention circuit 362 in accordance with the teachings of the present disclosure. As shown in the depicted example, saturation prevention circuit 700 includes input return 708, reset voltage sensing terminal R 728, input voltage sensing, or line sensing terminal L 730, gate signal GATE 732, GATE/2 signal 790, CLK/2 signal 792, STOP signal 776, a current source 777 with current $K_2I_2$, a current source 779 with current $K_{1A}I_1$, a switch S3 781, a switch S4 785, inverter 783, capacitor 786 with voltage $V_{LR}$, comparator 789, and reference generation circuit 796. Reference generation circuit 796 further includes a current source 787 with current $K_{1B}I_1$, a switch S5 797, a switch S6 788, a switch S7 794, a capacitor 782 with voltage $V_R$, a capacitor 784 with reference voltage $V_{REF}$, a flip flop 791, and an inverter 793. It is appreciated that the saturation prevention circuits 700 shown in FIG. 7 share similarities with the saturation prevention circuits 400 shown in FIG. 4. One difference, however, is that the example reference generation circuit 796 illustrated in FIG. 7 updates the reference voltage $V_{REF}$ 784 every other switching period $T_S$. In other words, the reference voltage $V_{REF}$ is held for two consecutive switching periods $T_S$ in accordance with the teachings of the present disclosure.

As shown in the depicted example, the reference generation circuit 796 includes a current source 787, which is a controlled current source responsive to the current received the reset voltage sensing terminal R 728, which is representative of the reset voltage $V_{RESET}$. The value of current source 787 is directly proportional to current $I_1$ received at the reset voltage sensing terminal R 728. In one example, the current provided by current source 779 is substantially equal to the current provided by current source 787. Current source 787 is further coupled to capacitor 782 through switch S7 794. The capacitor 782 is also coupled to input return 708. The voltage across capacitor 782 is denoted as $V_R$. Switch S5 797 is coupled across capacitor 782. In one embodiment, the value of capacitor 782 is substantially equal to the value of capacitor 786.

In operation, switch S7 794 is opened and closed in response to the GATE/2 signal 790. Further, switch S5 797 is coupled to the output of inverter 793 such that switch S5 797 is opened and closed in response to the inverted GATE/2 signal 790. In other words, when switch S7 794 is closed, switch S5 797 is open and vice versa. When switch S7 794 is closed, the current source 787 charges the capacitor 782 with a current substantially proportional to the first current $I_1$. In one example, when switch S5 797 is closed, capacitor 782 is discharged such that voltage $V_R$ is substantially zero.

GATE/2 signal 790 is a rectangular pulse waveform with varying lengths of logic high and logic low sections. GATE/2 790 is the Q output of flip flop 791. Flip flop 791 is coupled to receive the GATE signal 732 at the clock input (CLK) while the D input of the flip flop 791 is tied to its Q-bar output. As a result, the frequency of the GATE/2 signal 790 is substantially half of the GATE signal 732.

Further included in reference generation circuit 796 is switch S6 488 and capacitor 784. Capacitor 784 and switch S6 788 may be referred to as a sample and hold circuit. Switch S6 788 is coupled to capacitor 782 to sample and hold the value of capacitor 782 (voltage $V_R$ at the time of sampling) to capacitor 784 as reference voltage $V_{REF}$ 784. The output of the sample and hold circuit is received at the inverting input of comparator 789.

In the illustrated example, switch S6 788 is opened and closed in response to the CLK/2 792 signal. In one example, the CLK/2 signal is a rectangular pulse waveform and may be generated in response to the GATE/2 signal. For instance, in one example the CLK/2 signal may pulse to a logic high value at the falling edge of the GATE/2 signal. Since the GATE/2 790 signal has half the frequency of the GATE signal 732, the period of the GATE/2 signal 790 is substantially double the switching period $T_S$. As such, the CLK/2 signal also has a period which is double the switching period $T_S$. As a result, the reference voltage $V_{REF}$ 784 is updated every other switching period $T_S$. In one example, CLK/2 signal 792 may be generated by a monostable multivibrator that outputs a pulse (CLK/2 signal 792) at a falling edge of the GATE/2 signal.

In operation, and as will be further discussed with respect to FIG. 8 below, the capacitor 786 is charged in response to a combination of the currents provided by current sources 777 and 779 when switch S3 781 is closed (and switch S4 785 is open). In one example, the combination of the currents provided by current sources 777 and 779 is the sum of the currents provided by current sources 777 and 779. Switch S3 781 is closed when active switches S1 and S2 are closed. In other words, capacitor 786 is charged with the sum of the first current $I_1$ and the second current $I_2$ for the duration of the on-time $T_{ON}$. As such, the capacitor 786 integrates the sum of the first current $I_1$ and the second current $I_2$ over the on-time $T_{ON}$. The resultant voltage on capacitor 786 is received by the comparator 789 as voltage $V_{LR}$. The voltage $V_{LR}$ across capacitor 786 represents the left side of the inequality of equation (4) shown above. Switch S4 785 is closed and switch S3 781 is open when the passive switches D1 and D2 are conducting. As such, capacitor 786 is discharged and the voltage across capacitor 786 falls to zero. In another example, the voltage across capacitor 786 may fall to some predetermined value.

Further, capacitor 782 is charged by current source 787 for an entire switching period $T_S$. As shown, switch S6 788 samples the voltage $V_R$ on capacitor 782 at the end of every other switching period $T_S$ and holds the value on capacitor 784 as reference voltage $V_{REF}$. For the example shown, the reference voltage $V_{REF}$ is held for two consecutive switching periods. After the voltage $V_R$ is sampled, switch S5 is closed to discharge the capacitor 782 in the following cycle. As will be further explained, in the illustrated example the reference generation circuit 796 generates the reference voltage $V_{REF}$, which will be compared to the voltage $V_{LR}$ for the next two switching cycles.

The reference voltage $V_{REF}$ 784 from a previous switching cycle is compared to the voltage $V_{LR}$ on capacitor 786. If the voltage $V_{LR}$ reaches the reference voltage $V_{REF}$ while switch S3 781 is closed, the output of comparator 789 (i.e., STOP signal 776) pulses to a logic high value, which turns off the active switches S1 and S2 to prevent saturation in the energy transfer element in accordance with the teachings of the present disclosure.

Figure 8:
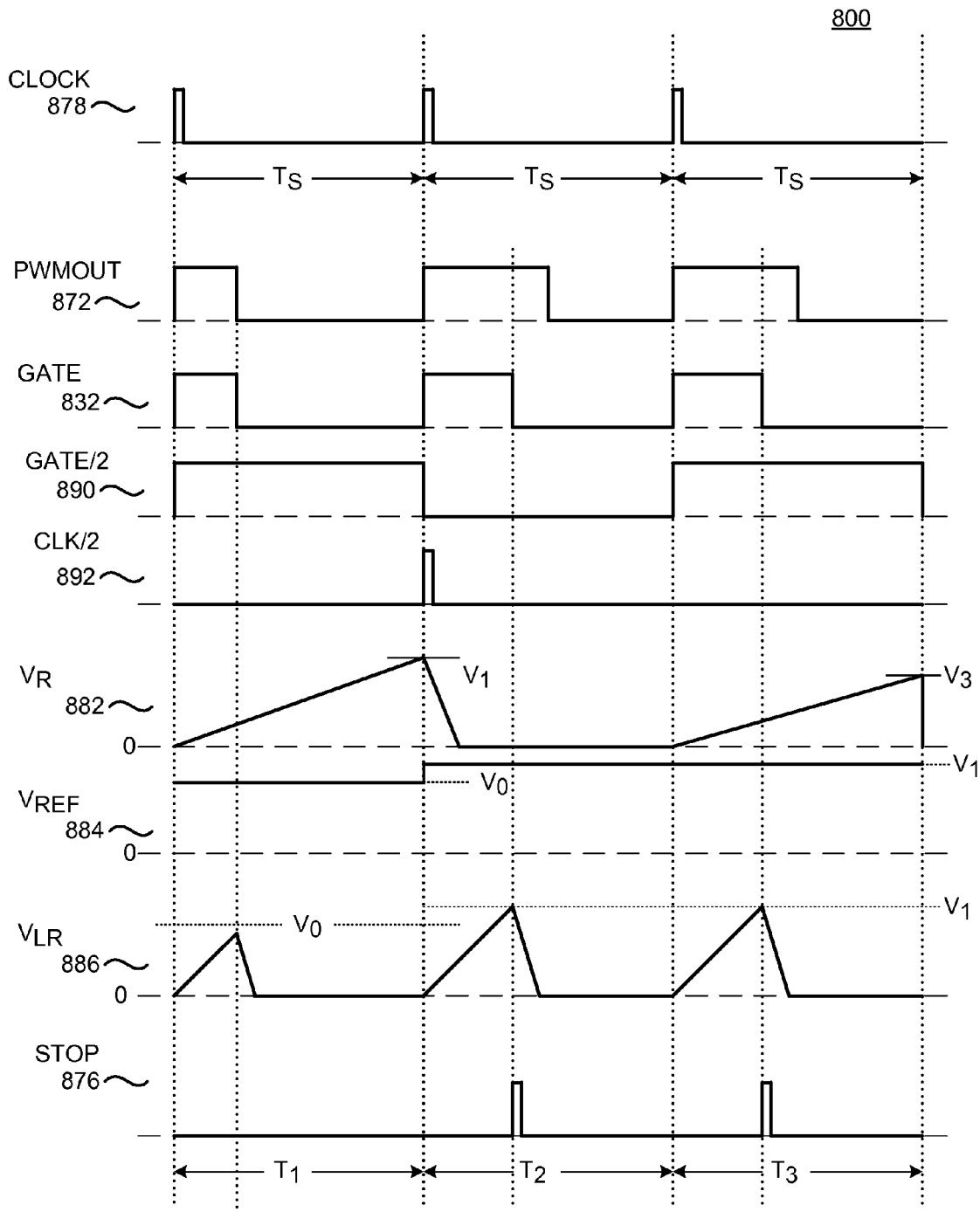
FIG. 8 is timing diagram illustrating example signals of the example saturation prevention circuit of FIG. 7 for a condition which terminates a gate signal to prevent saturation of an energy transfer element, in accordance with teachings of the present disclosure.

FIG. 8 is timing diagram 800 illustrating example signals of the saturation prevention circuit of FIG. 7 for a condition which terminates a gate signal to prevent saturation of an energy transfer element, in accordance with teachings of the present disclosure. It is appreciated that the signals illustrated in FIG. 8 are similar to the similarly numbered signals in FIGS. 5-6. In particular, CLOCK 878 pulses to a logic high value at the beginning of each switching cycle $T_S$. In the example, the PWMOUT 872 signal generated by the PWM 358 is a logic high value at the beginning of each switching cycle (T1, T2, and T3). As such, the GATE 832 signal is logic high at the beginning of each switching cycle. Further, the GATE signal 832 substantially follows the PWMOUT 572 signal unless the STOP 876 signal transitions to a logic high value. As shown in the example, the GATE/2 890 signal switches between logic high and logic low at half the frequency of the GATE 832 signal and the CLK/2 892 signal pulses to a logic high value at half the frequency of the CLK 878 signal. Timing diagram 800 also shows that in the illustrated example the $V_R$ 882 signal is charged while the GATE/2 890 signal is at a logic high value, and the $V_R$ 882 signal is discharged while the GATE/2 890 signal is at a logic low value.

In the illustrated example, the reference voltage $V_{REF}$ 884 is the value of $V_R$ 882, which was sampled and held from a previous switching cycle. For instance, as shown in the depicted example, during switching cycle T1, the $V_{REF}$ 884 value is V0, which was the value that $V_R$ 682 reached during a previous switching cycle. Similarly, during switching cycle T2, the $V_{REF}$ 884 value is V1, which was the value that $V_R$ 882 reached during the previous T1 switching cycle. However, the reference generation circuit updates the reference voltage $V_{REF}$ 884 every other switching cycle. As such, during switching cycle T3, the $V_{REF}$ 884 value is also V1, which was the value that $V_R$ 882 reached during the previous T1 switching cycle. The voltage $V_R$ 682 is sampled to capacitor 784 as reference voltage $V_{REF}$ 884 when the CLK/2 signal 892 pulses to a logic high value. When CLK/2 signal 892 pulses to a logic high value, the capacitor 782 is discharged and the voltage $V_R$ 582 falls to zero. The voltage $V_R$ 882 on capacitor 782 increases when the GATE/2 signal 832 is logic high.

The depicted example also shows that the $V_{LR}$ 686 voltage increases during each switching cycle while the GATE 832 signal is logic high and decreases when the GATE 832 signal is logic low. As shown in the example depicted in FIG. 8, when the $V_{LR}$ 886 voltage rises to the $V_{REF}$ 884 value, the STOP 876 signal pulses to a logic high value (because the output of comparator 776 pulses to a logic high value) and the gate 832 signal transitions to a logic low value and the active switches S1 and S2 are turned off for the remainder of the switching cycle, which helps to prevent saturation in the energy transfer element of the power converter in accordance with the teachings of the present disclosure.

Figure 9:
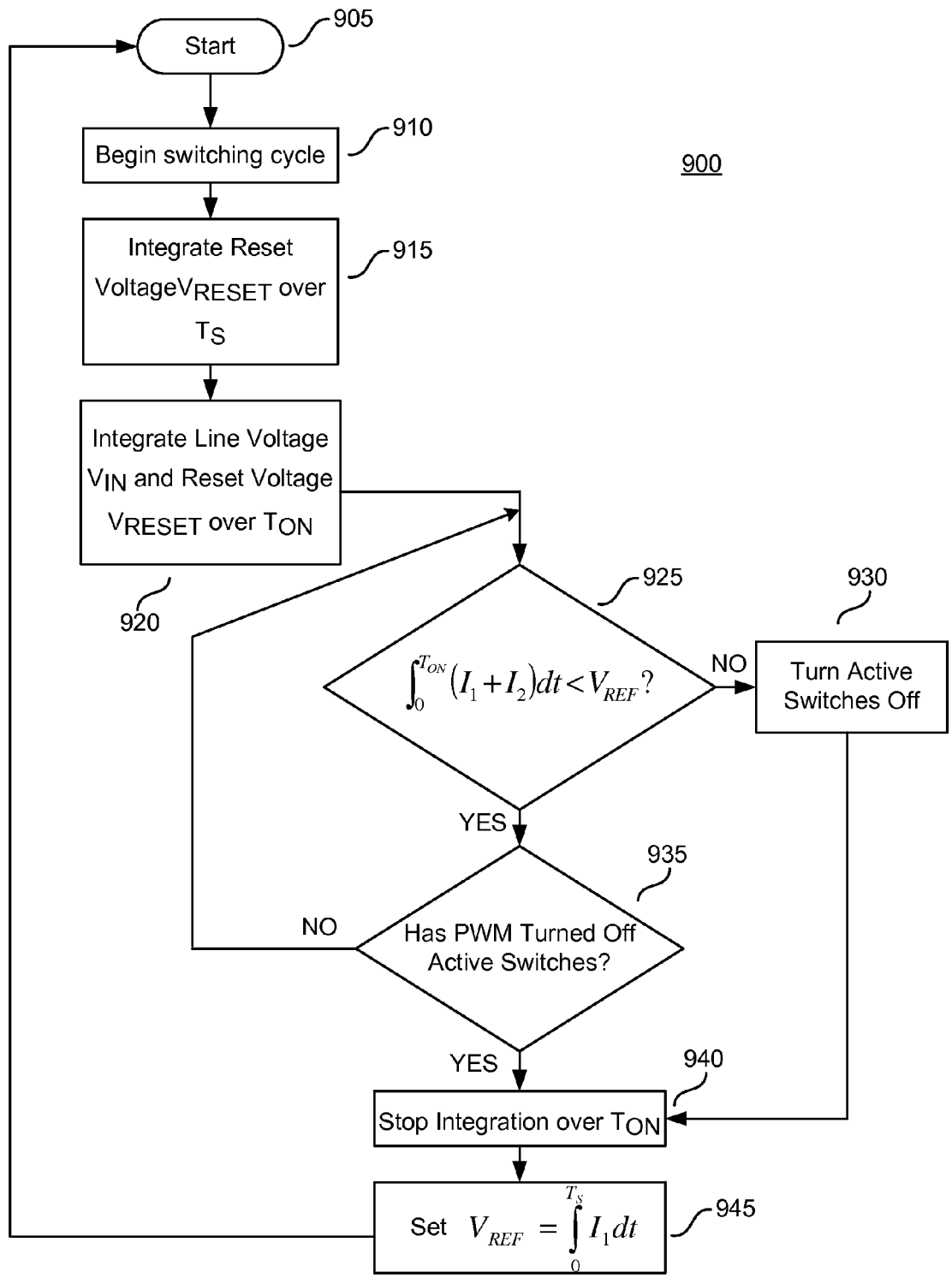
FIG. 9 is a flow diagram that illustrates an example method to prevent transformer saturation in a forward converter, in accordance with the teachings of the present disclosure.

FIG. 9 is a flow diagram 900 that illustrates an example process to prevent energy transfer element saturation in a forward converter in accordance with the teachings of the present disclosure. As illustrated, processing starts at processing block 905. A switching cycle begins at processing block 910 and the reset voltage $V_{RESET}$ is integrated over the on-time $T_{ON}$ and switching period $T_S$ at processing block 915. At processing block 920, the input voltage, or line voltage $V_{IN}$ is also integrated over the on-time $T_{ON}$. At decision block 925, the integral of the sum of current $I_1$ and current $I_2$ (representative of the input voltage $V_{IN}$ and the reset voltage $V_{RESET}$, respectively) over time is compared to the reference voltage $V_{REF}$. If the integral is greater than the reference voltage $V_{REF}$, the active switches are turned off at processing block 930 and the process continues to block 940. If the integral is less than the reference voltage, then the process is moved to block 935. In block 935, it is determined if the PWM has turned off the active switches. If the PWM has not turned off the active switches, the process returns to block 925. Otherwise, the process continues to processing block 940. At processing block 940, the integration over the on-time $T_{ON}$ is stopped and at processing block 945, the reference voltage $V_{REF}$ for the next switching cycles is set by integrating over time the current $I_1$ during the switching period $T_S$. At this point, processing loops back to the starting processing block 905 in accordance with the teachings of the present disclosure.

Figure 10:
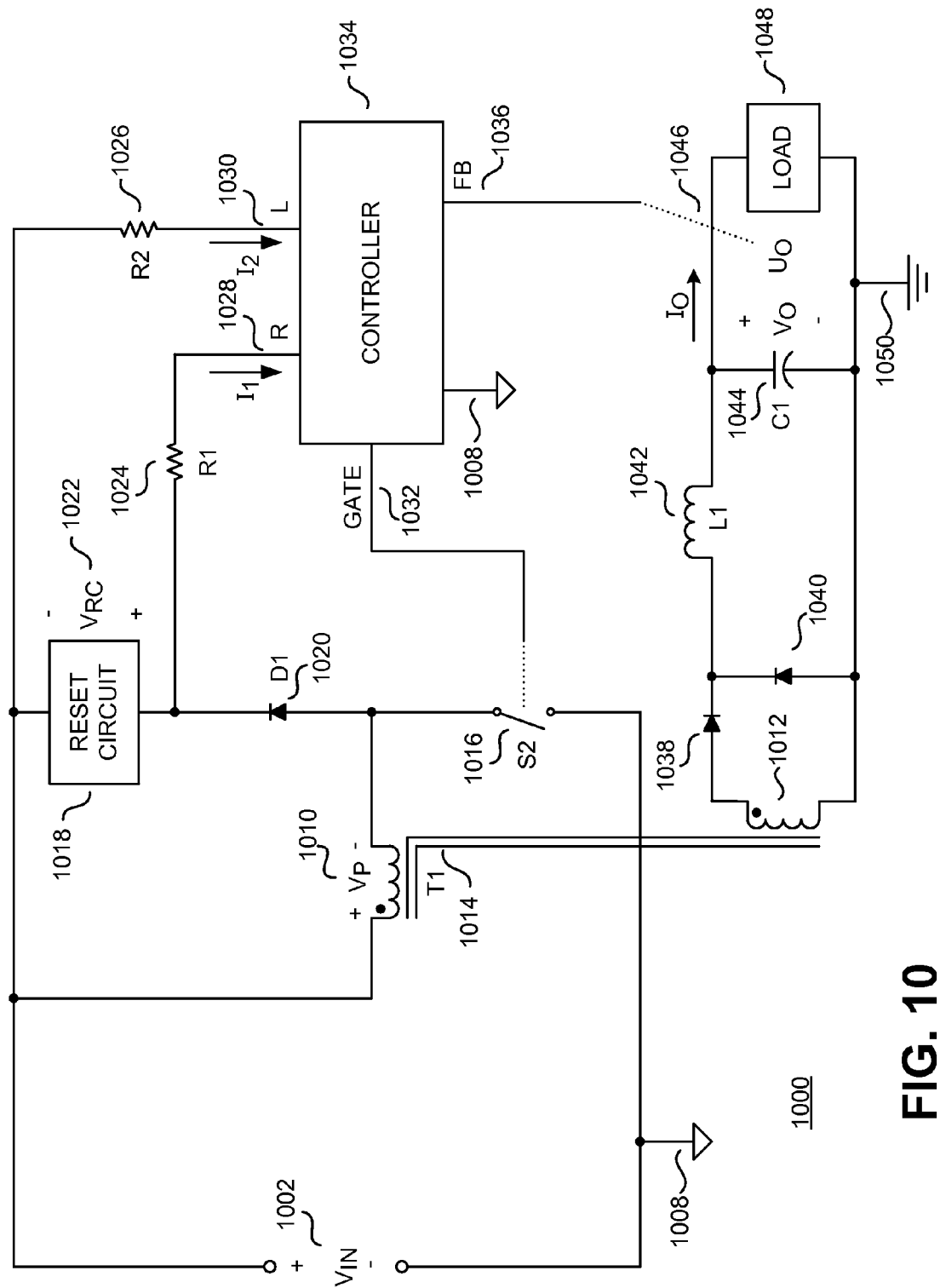
FIG. 10 is a schematic diagram illustrating an example single-switch forward converter including a controller, in accordance with teachings of the present disclosure.

FIG. 10 illustrates another example of power converter 1000 including a controller 1034, in accordance with teachings of the present disclosure. The illustrated example of power converter 1000 includes an energy transfer element T1 1014, a primary winding 1010 of the energy transfer element T1 1014, a secondary winding 1012 of the energy transfer element T1 114, an active switch S2 1016, a passive switch D1 1020, an input return 1008, a reset circuit 1018, a resistor R1 1024, a resistor R2 1026, an output diode 1038, a freewheeling diode 1040, an output inductor 1042, an output capacitor C1 1044, an output return 1050, and a controller 1034. Controller 1034 is shown as including a reset voltage sensing terminal 1028, an input voltage, or line sensing terminal 1030, a feedback terminal 1036, and a terminal which outputs a gate signal 1032, which may also be referred to as a drive signal. Also shown in FIG. 10 are an input voltage $V_{IN}$ 1002, a reset circuit voltage $V_{RC}$ 1022, a primary voltage $V_P$, a first current a second current $I_2$, a feedback signal 1046, an output quantity $U_O$, an output voltage $V_O$, an output current $I_O$, and a load 1048.

It is appreciated that the similarly named and numbered elements of the power converter 1000 function and are coupled in a similar fashion as those discussed above with regards the power converter 100 illustrated in FIG. 1. One difference, however, is that power converter 1000 of FIG. 10 is shown as having a single-switch forward converter topology rather than the two-switch forward converter topology as shown in FIG. 1. As such, power converter 1000 does not include active switch S1 and passive switch D2 as shown in FIG. 1. In addition, one end of the primary winding 1010 is coupled to the positive terminal of input voltage 1002.

As discussed above, magnetic flux increases and decreases at rates which are proportional to the voltage $V_P$ on the primary winding 1010. Therefore, when the active switch S2 1016 is on, the magnetic flux increases at a rate substantially proportional to the input voltage $V_{IN}$ 1002. Similarly, when passive switch D1 1020 is on, the magnetic flux decreases at a rate substantially proportional to the reset circuit voltage $V_{RC}$ 122. The voltage on the primary winding 1010 when the passive switch D1 1020 is on may be referred to as the reset voltage $V_{RESET}$ (mathematically: $V_{RESET}=V_{RC}$). To prevent saturation, the amount which the magnetic flux decreases when passive switch D2 1016 is on should equal the amount which the magnetic flux increased when active switch S2 1016 is on. Equation (2) from above expressed an inequality to prevent saturation of the energy transfer element in terms of input voltage $V_{IN}$, reset voltage $V_{RESET}$, on-time $T_{ON}$, and switching period $T_S$. By substituting the reset voltage $V_{RESET}$ with reset circuit voltage $V_{RC}$ 1022 for the power converter 1000 shown in FIG. 10, equation (2) can be expressed as:

$$(V_{IN}+V_{RC})T_{ON} \leq V_{RC}T_S \tag{5}$$

Equation (5) may be rewritten as:

$$(V_{IN}+V_{RC})T_{ON} \leq (V_{RC}+V_{IN}-V_{IN})T_S \tag{6}$$

As mentioned above, the first current $I_1$ is substantially proportional to the input voltage $V_{IN}$ 1002 plus the reset circuit voltage $V_{RC}$ 1022 while the second current $I_2$ is substantially proportional input voltage $V_{IN}$ 1002. Equation (6) may be expressed in terms of first current $I_1$ and second current $I_2$ (if resistors R1 1024 and resistor R2 1026 are substantially equal):

$$I_1 T_{ON} \leq (I_1-I_2)T_S \tag{7}$$

Equation (7) may be expressed as an integral:

$$\int_0^{T_{ON}} I_1 dt \leq \int_0^{T_S}(I_1-I_2)dt \tag{8}$$

In other words, an example power converter in accordance with the teachings of the present disclosure compares the time integral of the first current $I_1$ over the on-time $T_{ON}$ to the time integral of the first current $I_1$ minus the second current $I_2$ over the switching period $T_S$. As will be further discussed, if the value the time integral of the first current $I_1$ over the on-time $T_{ON}$ to the time integral of the first current $I_1$ minus the second current $I_2$ over the switching period $T_S$, the controller 1034 turns off active switch S2 1016 through gate signal 1032.

Figure 11:
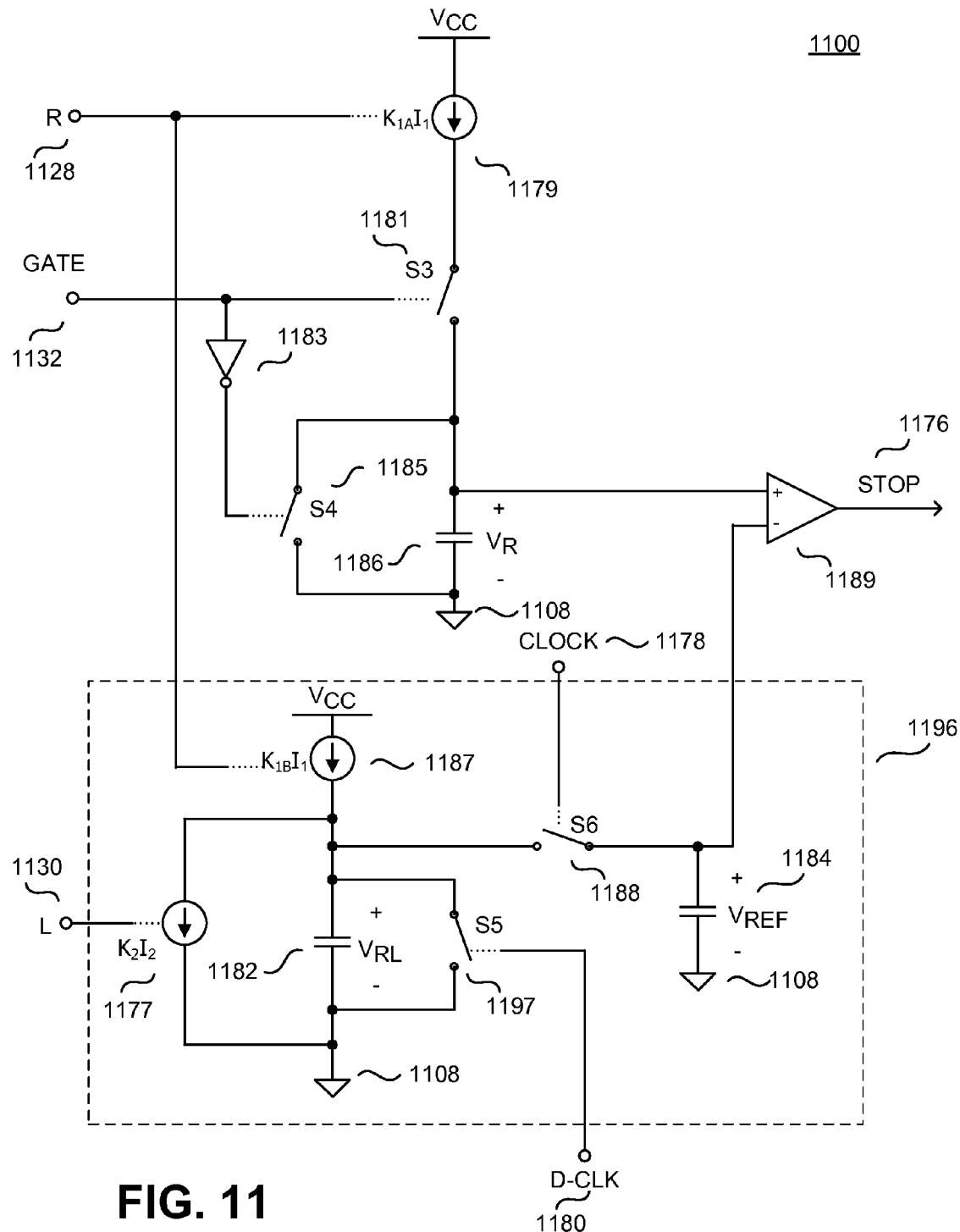
FIG. 11 is a schematic diagram illustrating yet another example of a saturation prevention circuit, in accordance with teachings of the present disclosure.

FIG. 11 illustrates another example saturation prevention circuit 1100, which is one example of a saturation prevention circuit 362. As shown in the depicted example, saturation prevention circuit 1100 includes input return 1108, reset voltage sensing terminal R 1128, input voltage or line sensing terminal L 1130, gate signal GATE 1132, a CLOCK signal 1178, a D-CLK 1180, STOP signal 1176, a current source 1179 with current $K_{1A}I_1$, a switch S3 1181, a switch S4 1185, inverter 1183, capacitor 1186 with voltage $V_R$, comparator 1189, and reference generation circuit 1196. Reference generation circuit 1196 further includes a current source 1187 with current $K_{1B}I_1$, a current source 1177 with current $K_2I_2$, a switch S5 1197, a switch S6 1188, a capacitor 1182 with voltage $V_{RL}$ and a capacitor 1184 with reference voltage $V_{REF}$. It is appreciated that saturation prevention circuit 1100 shares some similarities with saturation prevention circuit 400 of FIG. 4 and similarly named and numbered elements are coupled and function as described above with respect to FIG. 4. One difference, however, is that capacitor 1186 is charged by current source 1179 while capacitor 1182 is charged in response to a combination of current source 1187 and current source 1177. In the illustrated example, current source 1177 is coupled to provide a current such that the combination of current source 1187 and current source 1177 is the difference between current source 1187 and current source 1177.

As shown in the depicted example, current source 1179 is a controlled current source which is coupled to be responsive to the current received the reset voltage sensing terminal R 1128. The value of current source 1179 is directly proportional to current $I_1$ received at the reset voltage sensing terminal R 1128, which is representative of the sum of the input voltage $V_{IN}$ 1002 and the reset circuit voltage $V_{RC}$ 1022. As illustrated, current source 1179 provides a current with value $K_{1A}I_1$. Current source 1179 is coupled to switch S3 1181 and capacitor 1186 such that the capacitor 1186 is charged by the current provided by current source 1179 when switch S3 1181 is closed. For the example of FIG. 11, the voltage across capacitor 1186 is denoted as $V_R$. Switch S3 1181 is coupled to receive gate signal GATE 1132 and opens and closes in response to the gate signal GATE 1132. Capacitor 1186 is further coupled to the non-inverting terminal of comparator 1189 such that the comparator 1189 receives the voltage $V_R$.

Further shown in FIG. 11 is switch S4 1185 which is coupled across capacitor 1186. The output of inverter 1183 is coupled to control the switch S4 1185. As shown, the inverter 1183 receives the gate signal 1132 and the switch S4 is opened and closed in response to an inverted gate signal 1132.

Saturation prevention circuit 1100 further includes reference generation circuit 1196. Current source 1177 is a controlled current source which is coupled to be responsive to the current received by the line voltage sensing terminal L 1130. The value of the current source 1177 is directly proportional to the current $I_2$ received at the line voltage sensing terminal L 1130, which is representative of the input voltage $V_{IN}$. As illustrated, current source 1177 provides a current with value $K_2I_2$. Current source 1187 is a controlled current source coupled to be responsive to the current received the reset voltage sensing terminal R 1128. The value of current source 1187 is directly proportional to current $I_1$ received at the reset voltage sensing terminal R 1128, which is representative of the sum of the input voltage $V_{IN}$ 1002 and the reset circuit voltage $V_{RC}$ 1022. As illustrated, current source 1187 provides a current with value $K_{1B}I_1$. In one example, the current provided by current source 1179 is substantially equal to the current provided by current source 1187.

Current source 1187 is further coupled to capacitor 1182 and switch S5 1197. Switch S5 1197 and capacitor 1182 are further coupled to input return 1108. In one embodiment, the value of capacitor 1182 is substantially equal to the value of capacitor 1186. Switch S5 1197 is coupled to receive the D-CLK signal 1180 and opens and closes in response to the D-CLK signal 1180. In one embodiment, D-CLK signal 1180 is a rectangular pulse waveform with varying lengths of logic high and logic low sections. Further, the D-CLK signal 1180 may be a delayed version of CLOCK signal 1178. D-CLK signal 1180 pulses to a logic high value and quickly falls to a logic low value.

As illustrated in FIG. 11, switch S5 1197 is coupled across capacitor 1182. Further, current source 1177 is also coupled across capacitor 1182. In the illustrated example, when switch S5 1197 is open, the capacitor 1182 is charged by the difference between current source 1187 and current source 1177. The voltage across capacitor 1182 is denoted as voltage $V_{RL}$.

Similar to as discussed above with respect to FIG. 4, switch S6 1188 and capacitor 1184 sample and hold the voltage $V_{RL}$ across capacitor 1182. The voltage across capacitor 1184 is denoted as the reference voltage $V_{REF}$. Switch S6 1188 is opened and closed in response to the CLOCK signal 1178. In one example, the CLOCK signal 1178 is a pulse waveform and the time between leading edges is substantially equal to the switching period $T_S$. The D-CLK signal 1180 may be a delayed version of the CLOCK signal 1178. As such, D-CLK signal 1180 is also a pulse waveform and the time between leading edges is substantially equal to the switching period $T_S$. In the example illustrated, the reference voltage $V_{REF}$ across capacitor 1184 is updated every switching period $T_S$. However, the values of capacitor 1182 and 1184 may be adjusted to determine how quickly the value of capacitor 1182 is transferred to capacitor 1184. For example, the values of capacitor 1182 and 1184 may be selected such that it takes several switching cycles for $V_R$ to be transferred as $V_{REF}$. This would prevent the sampling of unwanted transient conditions (such as spikes in the input voltage). Further, an optional buffer may be included to facilitate the sample and hold of capacitor 1182. The output of the sample and hold circuit (i.e., the reference voltage $V_{REF}$) is coupled to and received by the inverting input of comparator 1189. Comparator 1189 compares the reference voltage $V_{REF}$ to the voltage $V_R$ on capacitor 1186. Output of comparator 1189 is denoted as the STOP signal 1176.

In operation, the capacitor 1186 is charged by the current provided by current source 1179 when switch S3 1181 is closed and switch S4 1185 is open. Switch S3 1181 is closed when active switch S2 1016 is closed. In other words, capacitor 1186 is charged with the first current $I_1$. As such, the capacitor 1186 integrates the first current $I_1$ over the on-time $T_{ON}$. The resultant voltage on capacitor 1186 is received by the comparator 1189 as voltage $V_R$. The voltage $V_R$ across capacitor 1186 represents the left side of the inequality of equation (8) shown above. Switch S4 1185 is closed and switch S3 1181 is open when the passive switch D1 1020 is conducting. As such, capacitor 1186 discharges and the voltage across capacitor 1186 decreases. In one example, the voltage across capacitor 1186 decreases to zero. In another embodiment, the voltage across capacitor 1186 may fall to some predetermined value.

Further, capacitor 1182 is charged by the difference between the currents provided by current source 1187 and current source 1177 for the entire switching period $T_S$. As shown, switch S6 1188 samples the voltage $V_R$ on capacitor 1182 at the end of the switching period $T_S$ and holds the value on capacitor 1184 as reference voltage $V_{REF}$ for a comparison in a subsequent switching cycle. After the voltage $V_R$ is sampled, switch S5 1197 is closed to quickly discharge the capacitor 1182. Reference generation circuit 1196 generates the reference voltage $V_{REF}$ which will be compared to the voltage $V_R$ for the next switching cycle.

The reference voltage $V_{REF}$ 1184 from a previous switching cycle is compared to the voltage $V_R$ on capacitor 1186. If the voltage $V_R$ reaches the reference voltage $V_{REF}$ while switch S3 1181 is closed, the output of comparator 1189 (i.e., STOP signal 476) pulses to a logic high value, which turns off the active switch S2 1016 to prevent saturation in the energy transfer element in accordance with the teachings of the present disclosure.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
    logic circuits to be coupled to turn on and turn off a switch of the power converter to regulate an output quantity of the power converter;
    a first integrating capacitor coupled to be charged with a simultaneous combination of a first current from a first current source and a second current from a second current source while the switch is turned on, wherein the first current is proportional to a reset voltage and wherein the second current is proportional to an input voltage of the power converter;

a reference generation circuit including a second integrating capacitor coupled to be charged with a third current from a third current source for an entire switching period of the switch during a previous switching cycle of the switch, wherein the third current is proportional to the reset voltage, wherein the entire switching period of the switch when the second integrating capacitor is charged with the third current is equal to a sum of an off time of the switch and an on time of the switch after the second integrating capacitor is discharged, such that after the second integrating capacitor is discharged the second integrating capacitor is coupled to be charged during the off time of the switch and during the on time of the switch during the previous cycle of the switch, wherein the reference generation circuit is coupled to generate a reference voltage in response to the second integrating capacitor; and a comparator coupled to provide a stop signal to the logic circuits to turn off the switch in response to a comparison of a voltage across the first integrating capacitor with the reference voltage.

2. The controller of claim 1 wherein the simultaneous combination of the first current and the second current is a sum of the first current and the second current.

3. The controller of claim 1 wherein the first integrating capacitor is coupled to be discharged while the switch is turned off.

4. The controller of claim 1 wherein the first integrating capacitor is coupled to be discharged at an end of a switching cycle of the switch.

5. The controller of claim 1 wherein the reference generation circuit includes a reference capacitor coupled to the second integrating capacitor to store the reference voltage.

6. The controller of claim 5 wherein the second integrating capacitor is coupled to be discharged after the reference voltage is stored in the reference capacitor from the second integrating capacitor.

7. The controller of claim 1 further comprising a pulse width modulator coupled to receive a feedback signal representative of the output quantity of the power converter, the pulse width modulator coupled to generate a pulse width modulation signal in response to the feedback signal coupled to be received by the logic circuits.

8. The controller of claim 1 further comprising an oscillator coupled to provide timing signals, wherein the switch is coupled to be responsive to the timing signals.

9. The controller of claim 1 wherein the switch is one of two active switches coupled to a primary winding of an energy transfer element of the power converter.

10. A controller for use in a power converter, comprising:
logic circuits to be coupled to turn on and turn off a switch of the power converter to regulate an output quantity of the power converter;
a first integrating capacitor coupled to be charged with a first current from a first current source while the switch is turned on, wherein the first current is proportional to a reset voltage of the power converter;
a reference generation circuit including a second integrating capacitor coupled to be charged with a simultaneous combination of a second current from a second current source and a third current from a third current source for an entire switching period of the switch during a previous switching cycle of the switch, wherein the entire switching period of the switch when the second integrating capacitor is charged with the simultaneous combination of the second current and the third current is equal to a sum of an off time of the switch and an on time of the switch after the second integrating capacitor is discharged, such that after the second integrating capacitor is discharged the second integrating capacitor is coupled to be charged during the off time of the switch and during the on time of the switch during the previous cycle of the switch, wherein the second current is proportional to the reset voltage and wherein the third current is proportional to an input voltage of the power converter, wherein the reference generation circuit is coupled to generate a reference voltage in response to the second integrating capacitor; and a comparator coupled to provide a stop signal to the logic circuits to turn off the switch in response to a comparison of a voltage across the first integrating capacitor with the reference voltage.

11. The controller of claim 10 wherein the simultaneous combination of the second current and the third current is a difference between the second current and the third current.

12. The controller of claim 10 wherein the switch is an active switch coupled to a primary winding of an energy transfer element of the power converter.

13. A power converter, comprising:
an energy transfer element having a primary winding;
a switch coupled to the energy transfer element to selectively apply an input voltage to the primary winding;
a reset circuit coupled to the primary winding; and
a control circuit coupled to the reset circuit and coupled to the switch, wherein the control circuit includes:
logic circuits to be coupled to turn on and turn off the switch to regulate an output quantity of the power converter;
a first integrating capacitor coupled to be charged with a simultaneous combination of a first current from a first current source and a second current from a second current source while the switch is turned on, wherein the first current is proportional to a reset voltage that is responsive to the reset circuit and wherein the second current is proportional to the input voltage;
a reference generation circuit including a second integrating capacitor coupled to be charged with a third current from a third current source for an entire switching period of the switch during a previous switching cycle of the switch, wherein the third current is proportional to the reset voltage, wherein the entire switching period of the switch when the second integrating capacitor is charged with the third current is equal to a sum of an off time of the switch and an on time of the switch after the second integrating capacitor is discharged, such that after the second integrating capacitor is discharged the second integrating capacitor is coupled to be charged during the off time of the switch and during the on time of the switch during the previous cycle of the switch, wherein the reference generation circuit is coupled to generate a reference voltage in response to the second integrating capacitor; and
a comparator coupled to provide a stop signal to the logic circuits to turn off the switch in response to a comparison of a voltage across the first integrating capacitor with the reference voltage.

14. The power converter of claim 13 wherein the simultaneous combination of the first current and the second current is a sum of the first current and the second current.

15. The power converter of claim 13 wherein the first integrating capacitor is coupled to be discharged while the switch is turned off.

16. The power converter of claim 13 wherein the first integrating capacitor is coupled to be discharged at an end of a switching cycle of the switch.

17. The power converter of claim 13 wherein the reference generation circuit includes a reference capacitor coupled to the second integrating capacitor to store the reference voltage.

18. The power converter of claim 17 wherein the second integrating capacitor is coupled to be discharged after the reference voltage is stored in the reference capacitor from the second integrating capacitor.

19. The power converter of claim 13 wherein the control circuit further includes a pulse width modulator coupled to receive a feedback signal representative of the output quantity of the power converter, the pulse width modulator coupled to generate a pulse width modulation signal in response to the feedback signal coupled to be received by the logic circuits.

20. The power converter of claim 13 wherein the control circuit further includes an oscillator coupled to provide timing signals, wherein the switch is coupled to be responsive to the timing signals.

21. The power converter of claim 13 wherein the switch is one of two active switches coupled to the primary winding.

22. The power converter of claim 13 wherein the reset voltage is responsive to a magnetizing current that leaves the energy transfer element when the switch is off.

23. The power converter of claim 13 wherein the reset voltage is substantially equal to a sum of the input voltage and a reset circuit voltage generated by the reset circuit.

24. A power converter, comprising:
an energy transfer element having a primary winding;
a switch coupled to the energy transfer element to selectively apply an input voltage to the primary winding;
a reset circuit coupled to the primary winding; and
a control circuit coupled to the reset circuit and coupled to the switch, wherein the control circuit includes:
logic circuits to be coupled to turn on and turn off the switch to regulate an output quantity of the power converter;
a first integrating capacitor coupled to be charged with a first current from a first current source while the switch is turned on, wherein the first current is proportional to a reset voltage that is responsive to the reset circuit;
a reference generation circuit including a second integrating capacitor coupled to be charged with a simultaneous combination of a second current from a second current source and a third current from a third current source for an entire switching period of the switch during a previous switching cycle of the switch, wherein the entire switching period of the switch when the second integrating capacitor is charged with the simultaneous combination of the second current and third current is equal to a sum of an off time of the switch and an on time of the switch after the second integrating capacitor is discharged, such that after the second integrating capacitor is discharged the second integrating capacitor is coupled to be charged during the off time of the switch and during the on time of the switch during the previous cycle of the switch, wherein the second current is proportional to the reset voltage and wherein the third current is proportional to the input voltage, wherein the reference generation circuit is coupled to generate a reference voltage in response to the second integrating capacitor; and
a comparator coupled to provide a stop signal to the logic circuits to turn off the switch in response to a comparison of a voltage across the first integrating capacitor with the reference voltage.

25. The power converter of claim 24 wherein the simultaneous combination of the second current and the third current is a difference between the second current and the third current.

26. The power converter of claim 24 wherein the switch is an active switch coupled to the primary winding.

27. The power converter of claim 24 wherein the reset voltage is responsive a magnetizing current that leaves the energy transfer element when the switch is off.

28. The power converter of claim 24 wherein the reset voltage is substantially equal to a reset circuit voltage generated by the reset circuit.

* * * * *